(12) United States Patent
Calmon et al.

(10) Patent No.: US 11,586,474 B2
(45) Date of Patent: Feb. 21, 2023

(54) ADAPTATION OF RESOURCE ALLOCATION FOR MULTIPLE WORKLOADS USING INTERFERENCE EFFECT OF RESOURCE ALLOCATION OF ADDITIONAL WORKLOADS ON PERFORMANCE

(71) Applicant: EMC IP Holding Company LLC, Hopkinton, MA (US)

(72) Inventors: Tiago Salviano Calmon, Rio de Janeiro (BR); Vinícius Michel Gottin, Rio de Janeiro (BR); Eduardo Vera Sousa, Niterói (BR)

(73) Assignee: EMC IP Holding Company LLC, Hopkinton, MA (US)

( * ) Notice: Subject to any disclaimer, the term of this patent is extended or adjusted under 35 U.S.C. 154(b) by 383 days.

(21) Appl. No.: 16/456,551

(22) Filed: Jun. 28, 2019

(65) Prior Publication Data
US 2020/0409758 A1    Dec. 31, 2020

(51) Int. Cl.
*G06F 9/46*    (2006.01)
*G06F 9/50*    (2006.01)
(Continued)

(52) U.S. Cl.
CPC ............... *G06F 9/505* (2013.01); *G06F 9/52* (2013.01); *G06N 3/08* (2013.01)

(58) Field of Classification Search
CPC .............. G06F 9/505; G06F 9/52; G06N 3/08
(Continued)

(56) References Cited

U.S. PATENT DOCUMENTS

| 5,519,605 A | 5/1996 | Cawlfield et al. |
| 7,039,559 B2 | 5/2006 | Froehlich et al. |

(Continued)

FOREIGN PATENT DOCUMENTS

CN    108881283 A    11/2018

OTHER PUBLICATIONS

U.S. Appl. No. 16/554,897, entitled, "Model-Based Initialization fo Workloads for Resource Allocation Adaptation", filed Aug. 29, 2019.
(Continued)

*Primary Examiner* — Bradley A Teets
(74) *Attorney, Agent, or Firm* — Ryan, Mason & Lewis, LLP

(57) ABSTRACT

Techniques are provided for adaptive resource allocation for multiple workloads. One method comprises obtaining a dynamic system model based on a relation between an amount of a resource for multiple iterative workloads and a predefined service metric; obtaining an instantaneous value of the predefined service metric; applying to a given controller associated with a given iterative workload of the multiple iterative workloads: (i) the dynamic system model, (ii) an interference effect of one or more additional iterative workloads on the given iterative workload, and (iii) a difference between the instantaneous value and a target value for the predefined service metric. The given controller applies an adjustment to the amount of the resource for the given iterative workload based at least in part on the difference. The resource allocation for the multiple iterative workloads can be performed in a sequence substantially in parallel with an execution of the iterative workloads.

20 Claims, 13 Drawing Sheets

(51) Int. Cl.
    *G06N 3/08*     (2023.01)
    *G06F 9/52*     (2006.01)

(58) Field of Classification Search
    USPC .......................................................... 718/104
    See application file for complete search history.

(56) References Cited

U.S. PATENT DOCUMENTS

| | | |
|---|---|---|
| 7,647,405 B2 | 1/2010 | Bivens et al. |
| 7,827,361 B1 | 11/2010 | Karlsson |
| 8,250,581 B1 | 8/2012 | Blanding |
| 8,429,096 B1 | 4/2013 | Soundararajan |
| 9,531,604 B2 | 12/2016 | Akolkar et al. |
| 10,257,275 B1 | 4/2019 | Dirac |
| 10,412,118 B1 | 9/2019 | Davis et al. |
| 10,642,763 B2 | 5/2020 | Longo |
| 2002/0055989 A1 | 5/2002 | Stringer-Calvert et al. |
| 2005/0188088 A1 | 8/2005 | Fellenstein |
| 2006/0280119 A1 | 12/2006 | Karamanolis et al. |
| 2006/0294044 A1 | 12/2006 | Karlsson et al. |
| 2007/0088532 A1 | 4/2007 | Alvarez et al. |
| 2007/0162161 A1 | 7/2007 | Kumar et al. |
| 2007/0234365 A1 | 10/2007 | Savit |
| 2007/0276512 A1 | 11/2007 | Fan et al. |
| 2007/0283016 A1 | 12/2007 | Pendarakis et al. |
| 2008/0022285 A1 | 1/2008 | Cherkasova |
| 2008/0180247 A1 | 7/2008 | Deoalikar et al. |
| 2010/0091786 A1 | 4/2010 | Liu et al. |
| 2010/0168989 A1 | 7/2010 | Gao |
| 2010/0299655 A1 | 11/2010 | Heisch et al. |
| 2010/0201573 A1 | 12/2010 | Lamming |
| 2012/0110582 A1 | 5/2012 | Ferdous et al. |
| 2013/0185433 A1 | 7/2013 | Zhu |
| 2014/0211811 A1 | 7/2014 | Ludwig |
| 2015/0007182 A1* | 1/2015 | Rossbach ............. G06F 9/4843 718/102 |
| 2015/0040133 A1 | 2/2015 | Caufield |
| 2016/0147203 A1 | 5/2016 | Di Cairano |
| 2016/0162209 A1* | 6/2016 | Calderone ............. G06F 3/0647 711/114 |
| 2017/0048308 A1 | 2/2017 | Qaisar |
| 2017/0161199 A1 | 6/2017 | Shah |
| 2017/0242729 A1 | 8/2017 | Chen et al. |
| 2017/0255491 A1 | 9/2017 | Bradshaw et al. |
| 2018/0101214 A1 | 4/2018 | Mahindru |
| 2018/0176089 A1 | 6/2018 | Ritter et al. |
| 2018/0246558 A1 | 8/2018 | Morad |
| 2019/0075184 A1 | 3/2019 | Seed, IV et al. |
| 2019/0101903 A1 | 4/2019 | Katti et al. |
| 2019/0266015 A1* | 8/2019 | Chandra ............... G06F 9/5027 |
| 2019/0319861 A1 | 10/2019 | Pan et al. |
| 2020/0167145 A1 | 5/2020 | Franchitti et al. |
| 2020/0177671 A1 | 6/2020 | Tofighbakhsh et al. |
| 2020/0241921 A1* | 7/2020 | Calmon .................. G06F 30/20 |
| 2020/0301741 A1 | 9/2020 | Gabrielson et al. |
| 2020/0348979 A1* | 11/2020 | Calmon ................ G06F 9/5033 |

OTHER PUBLICATIONS

U.S. Appl. No. 16/554,910, entitled, "Early-Convergence Detection for Online Resource Allocation Policies for Iterative Workloads", filed Aug. 29, 2019.
Atzori et al., "The Internet of Things: A survey," Computer Networks, 54 (2010) 2787-2805.
Schooler et al., "Architectural Vision for a Data-Centric IoT: Rethinking Things, Trust and Clouds," In Distributed Computing Systems (ICDCS), 2017 IEEE 37th International Conference on (pp. 1717-1728). IEEE.
Bonomi et al., "Fog computing and its role in the internet of things," In Proceedings of the first edition of the MCC workshop on Mobile cloud computing (pp. 13-16). ACM, 2012.
Shi et al., "Edge computing: Vision and challenges," IEEE Internet of Things Journal, 3(5), 637-646.
Mahadev et al., "The Case for VM-Based Cloudlets in Mobile Computing, Pervasive Computing," IEEE, 8 (2009) 14-23.
Morabito et al., "Consolidate IoT edge computing with lightweight virtualization," IEEE Network, 32(1), 102-111.
Ismail et al., "Evaluation of docker as edge computing platform," In Open Systems (ICOS), 2015 IEEE Confernece on (pp. 130-135). IEEE.
Mahmud et al., "Fog computing: A taxonomy, survey and future directions," In Internet of Everything (pp. 103-130). Springer, Singapore.
Inaba et al., "Applications of weighted Voronoi diagrams and randomization to variance-based k-clustering," In Proceedings of the tenth annual symposium on Computational geometry (pp. 332-339). ACM.
Thönes, J. "Microservices." IEEE Software 32.1 (2015): 116-116.
Lewis et al., "Microservices," Available in: http://martinfowler.com/articles/microservices.html. Access in: Sep. 27, 2017.
Pahl et al., "Containers and clusters for edge cloud architectures—a technology review," In Future Internet of Things and Cloud (FiCloud), 2015 3rd International Conference on (pp. 379-386). IEEE.
Misra et al., "On Theoretical Modeling of Sensor Cloud: A Paradigm Shift From Wireless Sensor Network," IEEE Systems Journal, vol. 11, No. 2, pp. 1084-1093, Jun. 2017.
Taleb et al., "Mobile edge computing potential in making cities smarter," IEEE Communications Magazine, 55(3), 38-43.
Bouzeghoub, M., "A framework for analysis of data freshness," In Proceedings of the 2004 international workshop on Information quality in information systems (pp. 59-67). ACM.
"CEP," Available in: https://en.wikipedia.org/wiki/Complex_event_processing.
"Publish-subscribe pattern," Available in: https://en.wikipedia.org/wiki/Publish%E2%80%93subscribe_pattern.
Chatterjee et al., "Optimal Composition of a Virtual Sensor for Efficient Virtualization within Sensor-Cloud," in Proceedings of IEEE International Conferencce on Communications, Jun. 2015, pp. 448-453.
Yi et al., "A survey of fog computing: concepts, applications and issues." Proceedings of the 2015 Workshop on Mobile Big Data. ACM, 2015.
Santos et al., "Olympus: The cloud of sensors," IEEE Cloud Computing, 2(2), 48-56.
Delicato et al.,. "The Resource Management Challenge in IoT," In Resource Management for Internet of Things (pp. 7-18). Springer International Publishing (2017).
Wang et al., "ENORM: A framework for edge node resource management," IEEE Transactions on Services Computing (2017).
Skarlat et al., "Resource Provisioning for IoT Services in the Fog," 2016 IEEE 9th International Conference on Service-Oriented Computing and Applications (SOCA), Macau, 2016, pp. 32-39.
Roy et al., "DIVISOR: Dynamic Virtual Sensor Formation for Overlapping Region in IoT-based Sensor-Cloud," Proceedings of the IEEE Wireless Communications and Networking Conference, 2018.
Skarlat et al., "Optimized IoT service placement in the fog," Serv. Oriented Comput. Appl. 11, 4 (Dec. 2017), 427-443. DOI: https://doi.org/10.1007/s11761-017-0219-8 (2017).
Dautov et al., "Pushing Intelligence to the Edge with a Stream Processing Architecture," 2017 IEEE International Conference on Internet of Things (iThings) and IEEE Green Computing and Methods and Apparatus for Real-Time Anomaly Detection over Sets of Time Series—Nov. 2017 Dell EMC Confidential pp. 24 of 24 Communications (GreenCom) and IEEE Cyber, Physical and Social Computing (CPSCom) and IEEE Smart Data (SmartData), Exeter, 2017, pp. 792-799.
"Hypervisor," Available in: https://en.wikipedia.org/wiki/Hypervisor.
"EdgeX Foundry," Available in: https://www.edgexfoundry.org.
"Orion Context Broker," Available in: https://catalogue.fiware.org/enablers/publishsubscribe-context-broker-orion-context-broker.
"FIWARE NGSI Open RESTful API Specification," Available in: http://forge.fiware.org/plugins/mediawiki/wiki/fiware/index.php/FIWARE_NGSI_Open_RESTful_API_Specification. Last accessed: Jun. 28, 2018.

(56) References Cited

OTHER PUBLICATIONS

"ZeroMQ," Available in: htttps://en.wikipedia.org/wiki/ZeroMQ.
D. Merkel, "Docker: Lightweight Linux Containers for Consistent Development and Deployment," Linux Journal, vol. 2, p. 234, (2014).
Betts, et al., "Estimating the WCET of GPU-accelerated applications using hybrid analysis," Real-Time Systems (ECRTS), 2013.
K. Hornik, "Approximation capabilities of multilayer feedforward networks," Neural networks, vol. 2, No. 4, pp. 251-257, 1991.
U.S. Appl. No. 15/941,434, entitled, "Allocation of Shared Computing Resources Using Source Code Feature Extraction and Machine Learning", filed Mar. 30, 2018.
U.S. Appl. No. 16/039,743, entitled, "Allocation of Shared Computing Resources Using Source Code Feature Extraction and Clustering-Based Training of Machine Learning Models", filed Jul. 19, 2018.
U.S. Appl. No. 16/259,244, entitled, Building Neural Networks for Resource Allocation for Iterative Workloads Using Reinforcement Learning, filed Jan. 28, 2019.
U.S. Appl. No. 16/401,604, entitled, "Resource Allocation and Provisioning in a Multi-Tier Edge-Cloud Virtualization Environment", filed May 2, 2019.
U.S. Appl. No. 16/263,135 entitled, "Adaptive Look-Ahead Configuration for Prefetching Data in Input/Output Operations," filed Jan. 31, 2019.
U.S. Appl. No. 16/397,596, entitled, "Adaptive Look-Ahead Configuration for Pre-Fetching Data in Input/Output Operations Based on Request Size and Frequency", filed Apr. 29, 2019.
Abdelzaher et al., "Introduction to Control Theory And Its Application to Computing Systems", Performance Modeling and Engineering—Chapter 7 (Year: 2008).
Calmon et al., "Control strategies for adaptive resource allocation in cloud computing", 21st IFAC World Congress (Virtual), Berlin, Germany (Jul. 12-17, 2020).
Patikirikorala et al., "Towards Optimal Performance and Resource Management in Web Systems via Model Predictive Control", 2011 Australian Control Conference, Melbourne, Australia (Nov. 10 & 11, 2011).
Skarin et al., "An assisting Model Predictive Controller approach to Control over the Cloud", Lund University (May 15, 2019).
U.S. Appl. No. 16/400,289 entitled, "Adaptive Controller for Online Adaptation of Resource Allocation Policies for Iterative Workloads Using Reinforcement Learning," filed May 1, 2019.
Liu et al. "Adaptive Entitlement Control of Resource Containers on Shared Servers," IFIP/IEEE International Symposium on Integrated Network Management, pp. 163-176, (2005).
Huber et al. "Model-Based Self-Aware Performance and Resource Management Using the Descartes Modeling Language," in IEEE Transactions on Software Engineering, vol. 43, No. 5, pp. 432-452, May 1, 2017, doi: 10.1109/TSE.2016.2613863. (Year: 2017).
Sudarsan et al.; "Design and performance of a scheduling framework for resizable parallel applications", (Year: 2010).
Nguyen et al.; "Using Runtime Measured Workload Characteristics in Parallel Processor Scheduling", (Year: 1996).
Azhar et al.; "SLOOP: QoS-Supervised Loop Execution to Reduce Energy on Heterogeneous Architectures", (Year: 2017).
Thamsen et al; "Continuously Improving the Resource Utilization of Iterative Parallel Dataflows", (Year: 2016).
Corbalan, Julita et al.; "Dynamic Performance Analysis: SelfAnalyzer"; Departamentd'Arquitectura de Computadors (DAC), Universitat Politecnica de Catalunya (UPC) (Year: 2004).
Martin, Gonzalez et al.; "Enhancing the Performance of Malleable MPI Applications by Using Performance-Aware Dynamic Reconfiguration"; Parallel Computing 46 (Year: 2015).
Raveendran, Aarthi, et al.; "A Framework for Elastic Execution of Existing MPI Programs"; 2011 IEEE International Parallel and Distributed Processing Symposium (Year: 2011).

\* cited by examiner

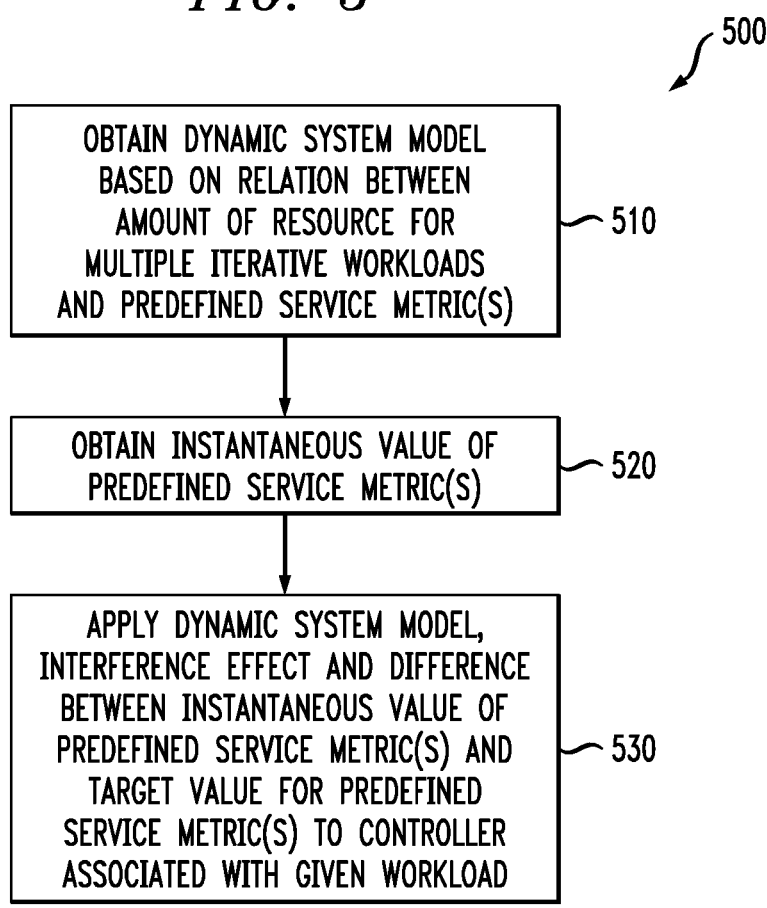

ADAPTATION OF RESOURCE ALLOCATION FOR MULTIPLE WORKLOADS USING INTERFERENCE EFFECT OF RESOURCE ALLOCATION OF ADDITIONAL WORKLOADS ON PERFORMANCE

FIELD

The field relates generally to resource allocation techniques.

BACKGROUND

Cloud computing has become increasingly popular due to a number of benefits. For example, cloud computing offers pay-per-use computation for customers and resource sharing for service providers. Through virtualization, a pool of computation devices can be abstracted and computational resources can be offered that are tailored to the needs of customers, who may contract for more computation as their needs grow.

Using an infrastructure efficiently to execute workloads while respecting Service Level Agreements (SLAs) and, thus, guaranteeing a specified Quality of Service, poses a number of challenges. Service providers aim to provide services to their customers while respecting SLAs and minimizing resource usage. One challenge is that SLAs are typically set prior to execution of a job, but the execution environment is subject to a number of possible disturbances (e.g., poor knowledge about actual resource needs, demand peaks and/or hardware malfunctions). Thus, employing a fixed amount of allocated resources may not be a good solution.

A need therefore exists for improved techniques for resource allocation for execution of multiple workloads.

SUMMARY

In one embodiment, a method comprises obtaining a dynamic system model based on a relation between an amount of at least one resource for a plurality of iterative workloads and at least one predefined service metric; obtaining, from a resource allocation correction module, an instantaneous value of the at least one predefined service metric; applying to a given controller associated with a given one of the plurality of iterative workloads: (i) the dynamic system model, (ii) an interference effect of one or more additional iterative workloads of the plurality of iterative workloads on the given one of the plurality of iterative workloads, and (iii) a difference between the instantaneous value of the at least one predefined service metric and a target value for the at least one predefined service metric, wherein the given controller determines an adjustment to the amount of the at least one resource for the given one of the plurality of iterative workloads based at least in part on the difference; and initiating, by the given controller, an application of the determined adjustment to the given one of the plurality of iterative workloads.

In one or more embodiments, a self-allocation effect of the given one of the plurality of iterative workloads on itself with respect to the at least one predefined service metric is determined separately from the interference effect of the one or more additional iterative workloads of the plurality of iterative workloads on the given one of the plurality of iterative workloads with respect to the at least one predefined service metric.

In some embodiments, the disclosed resource allocation for the plurality of iterative workloads is performed substantially in parallel with an execution of the plurality of iterative workloads. The interference effect of the one or more of the plurality of iterative workloads on the given one of the plurality of iterative workloads can be determined in a sequence. In addition, an iterative workload that finishes processing and/or fails processing can be removed from the sequence and/or a newly deployed workload can be added to the sequence.

Other illustrative embodiments include, without limitation, apparatus, systems, methods and computer program products comprising processor-readable storage media.

BRIEF DESCRIPTION OF THE DRAWINGS

FIG. 5 is a flow chart illustrating an exemplary implementation of a resource allocation adaptation process for multiple workloads, according to one embodiment of the disclosure;

DETAILED DESCRIPTION

Figure 1:
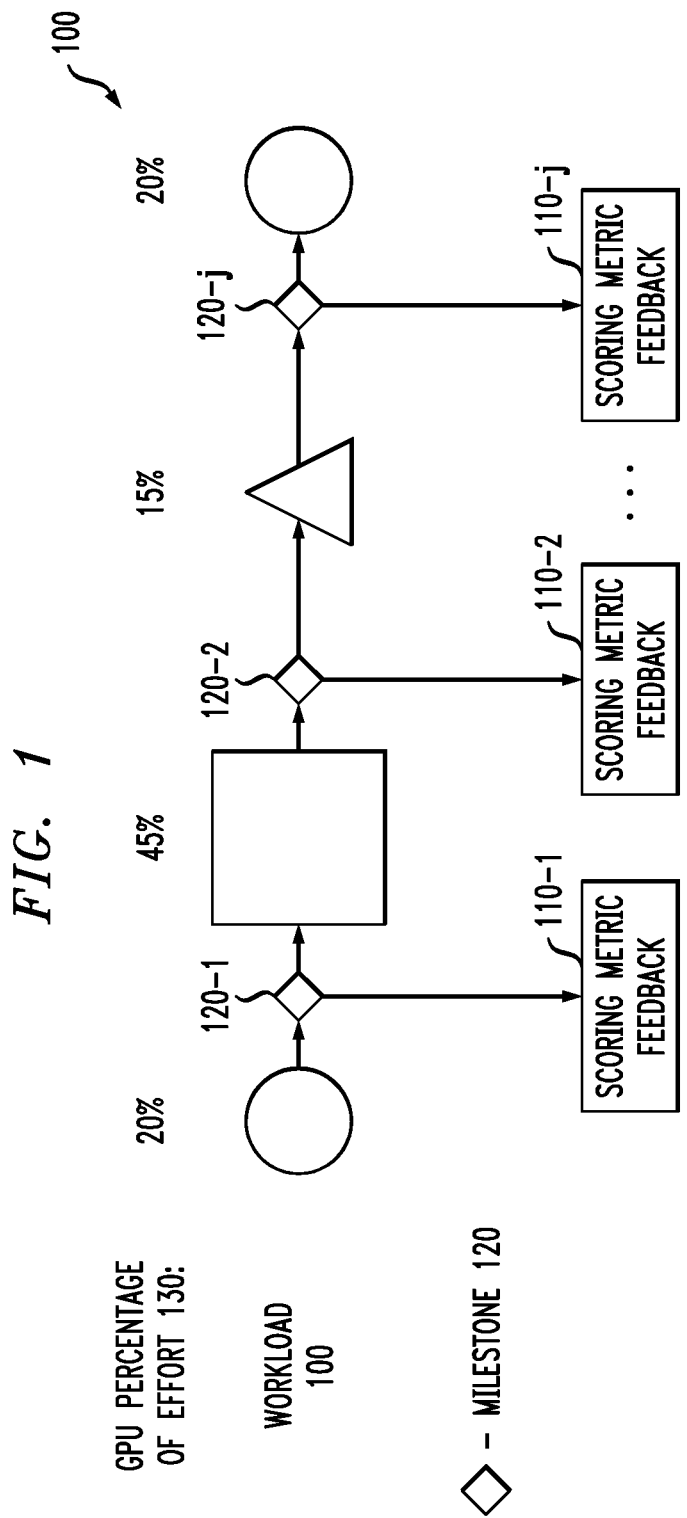
FIG. 1 illustrates a given workload with milestones and associated effort for a given infrastructure, according to one embodiment of the disclosure.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for adapting a resource allocation for multiple workloads.

In one or more embodiments, control theory-based techniques are provided for adapting resource allocations for multiple workloads. In some embodiments, a resource allocation is adapted using information feedback to control a behavior of the workload. Generally, control theory, and, specifically, feedback control, have strong mathematical foundations and ensure important characteristics such as stability, resiliency to disturbances and robustness. See, for example, Katsuhiko Ogata, Modern Control Engineering (Fifth Edition; India: Prentice Hall, 2002). A cyclic controller separately performs a self-allocation of resources for a given workload in the multiple workloads and an allocation of resources that accounts for interference effects from the additional workloads in the multiple workloads.

In one embodiment, the disclosed techniques for adapting a resource allocation for a particular workload are lightweight and may work as a cost minimization algorithm. This feature is present not only when the allocation occurs, but also for the determination of intermediate measurements. In this manner, the resource allocation adaptation does not interfere with the actual workload. Such features could also be mimicked by usage of, for instance, optimization routines. However, optimization routines may take a long time to run, and this is prohibitive in terms of quick online adaptation. Also, just running such algorithms would impose a new, heavy workload, which is also a burden to the infrastructure.

In cloud computing environments, a number of resource abstractions have emerged, such as containers. Containers allow providers to offer computation without customers knowing which underlying infrastructure is executing the software code. This can be achieved in the Platform-as-a-Service (PaaS) paradigm and also the Function-as-a-Service (FaaS) paradigm (also known as serverless computing).

In the PaaS and FaaS paradigms, the usual agreements regarding a quality of service expected by the customer are typically expressed through several Service Level Agreements (SLAs). SLAs may include, for example, response time, execution time and uptime percentage. The levels of SLAs are usually agreed upon prior to the service through reference values often referred to as SLA metrics, and must be followed. If the SLA agreements are not satisfied, the providers must typically pay fines and may also diminish the trust that a customer perceives of the service.

One way to ensure that SLAs are satisfied is to dedicate an amount of resources to them. There are two problems with this approach. Firstly, in general, an application cannot be assumed to be bounded by one particular resource. Some applications, for example, might have an input/output-intensive phase and, afterwards, a compute-intensive phase. Dedicating resources to an application in such a scenario might be inefficient, resulting in spare resources at the different phases of the application. In addition, the initial estimate of how many resources are needed to run an application might be either oversized or undersized.

While SLAs are typically set prior to the execution of a job, the execution environment is quite dynamic. New workloads might come and compete for resources and unplanned demand peaks might occur, which may disrupt the original workload planning due to tasks with higher priorities, a greater need to share the environment and/or overheads because of context switching.

Service providers aim to provide services to their customers while respecting SLAs and minimizing resource usage. This is the scenario that provides the optimal profit for them. To do so, a static approach of allocation, which dedicates resources to a job from its start through its completion, is naturally inefficient, and, thus, sub-optimal. In this invention, we propose a methodology to dynamically allocate resources based on feedback of the job execution and prior knowledge of its stages. The disclosed resource allocation mechanism controls multiple iterative workloads using a cycling control/adaptation and the ability to learn how interference affects each monitored workload.

A characteristic of infrastructure provision is the variability in perceived demand. Since service providers are willing to charge an amount per computation usage, and these providers can have a lot of customers, it is natural that the demand varies within different time frames, on a daily basis, a weekly basis and even a monthly basis. This demand variation itself imposes a number of challenges, since the intention of the provider is to serve each customer at the level of service defined in contract.

The aforementioned contracts, typically materialized in multiple SLAs, also impose a significant challenge. The contracts are typically set prior to the service provisioning. Thus, no matter what happens at the time of execution, these SLAs must be respected. Examples of events that could disrupt service providers include, but are not limited to, sharp demand peaks, malfunction of machines and unrealistic contracts. In some cases, it is not possible to reach every single SLA, and it is also an important decision to prioritize some of the workloads to the detriment of others. Thus, there are a number of challenges.

Service providers aim to comply with all contracts made with their respective customers. Even though some knowledge of the future workloads exist and a demand prediction engine may be set, there are often some errors, which may make it infeasible to respect all SLAs. Furthermore, there are multiple kinds of agreements, which might range from sharp agreements (e.g., to meet the requirements generates a level of revenue; and to break the requirements generates a penalty) to softer ones (e.g., the level of revenue generated for the service provider by running a workload depends on the performance). In addition, hardware must not be assumed to always be running perfectly, because malfunctions may occur. Each of these situations will require actions by the provider to mitigate issues while impacting the execution of all workloads to an acceptable minimum.

Another way to ensure that SLAs are satisfied is to dedicate a certain amount of resources to a particular job. This solution might lead to a full fulfillment of SLAs, but the solution is not cost effective. Workloads might have different needs over time, for example, or they may be intensive for a single resource but not for other resources. To dedicate devices for some workloads is not suitable on both ends of the demand spectrum: on one end, there is the situation when demand is low and dedicating resources is possible, but not cost effective. On the other end of the spectrum, if demand is high, dedicating resources will lead to fewer workloads executed over time, which reduces the overall throughput of the provider, which is reflected in reduced revenue generated.

One or more aspects of the present disclosure recognize that an allocation of resources to one workload affects the performance of all other workloads in a shared computational environment. This is the case even when the allocated resources for those other workloads are unchanged (e.g., the interference stems from low-level interaction in the hardware or processing systems). Techniques are provided to cope with the interference of multiple workloads in relation to each other.

The direct impact of changing allocations to a particular workload is considered, as well as the interference caused by other workloads to the particular workload. One or more aspects of the present disclosure recognize that attempting to adapt both metrics at the same time confounds the impact of self-allocation and other allocations in the observed SLA variation.

Given that workloads may fail for a variety of reasons, it is desirable in some embodiments for the control process to deal transparently with failed workloads, supporting their redeployment in a straightforward manner.

Control Theory-Based Resource Allocation Adaptation

One or more embodiments provide a mechanism to automatically adapt an infrastructure in order to accommodate workload necessity. The exemplary disclosed mechanism works by measuring the current performance of a workload and comparing the measured current performance to reference levels. This comparison allows on-the-fly adaptations to be performed and ensures a substantially maximum profit generation by respecting the SLAs associated with the workloads with higher profit generation potential, or the ones that lead to the highest fines if not respected.

FIG. 1 illustrates a given workload 100 with well-defined milestones 120 and associated effort 130 for a given infrastructure, according to one embodiment of the disclosure. One example of this kind of job is the training of a Deep Neural Network, which is performed in fixed-size iterations. It is assumed that workload 100 will produce information feedback 110-1 through 110-$n$, such as a scoring metric feedback 110-1, a scoring metric feedback 110-2, and a scoring metric feedback 110-$j$.

As shown in Adam Betts and Alastair F. Donaldson, "Estimating the WCET of GPU-Accelerated Applications Using Hybrid Analysis," *Real-Time Systems (ECRTS)* (2013), incorporated by reference herein in its entirety, ultimately, source code can be instrumented to perform such actions. So, this step is considered feasible for all kinds of jobs. In more well-behaved and specific embodiments, the source code is instrumented with intermediate feedback as a design decision.

As shown in FIG. 1, the percentage of effort 130 for a given infrastructure, such as a graphics processing unit (GPUs), is indicated between each exemplary milestone 120-1 through 120-$j$ of the workload 100.

Figure 2:
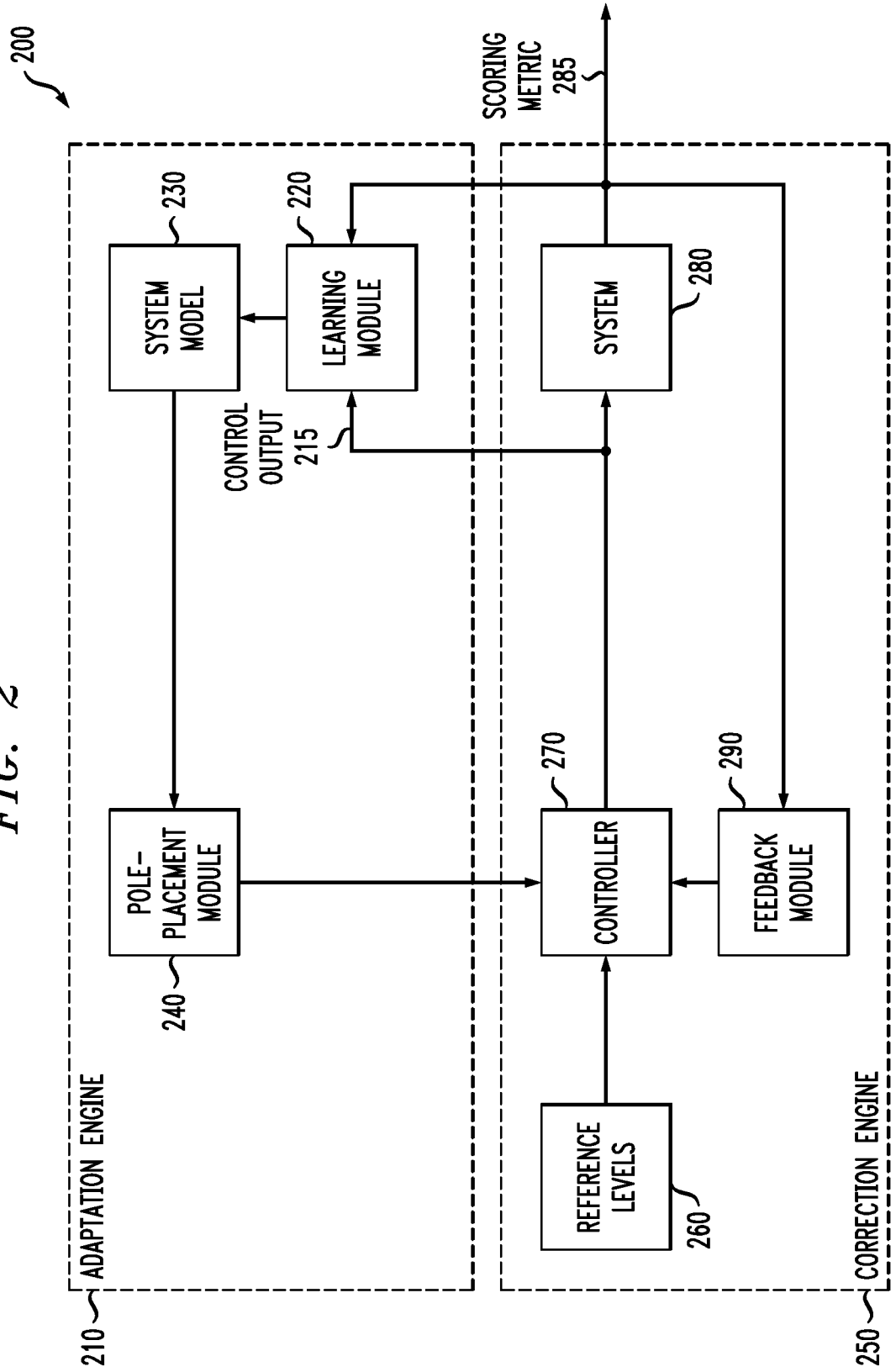
FIG. 2 illustrates a block diagram of an exemplary adaptation-correction system, according to some embodiments.

FIG. 2 illustrates a block diagram of an exemplary adaptation-correction system 200, according to some embodiments. As shown in FIG. 2, the exemplary adaptation-correction system 200 comprises two structures, namely, an adaptation engine 210 and a correction engine 250.

Generally, the exemplary adaptation engine 210 aims to map decisions and responses in order to get a transfer function between allocations and a given SLA metric, as discussed further below in conjunction with FIG. 4A. The exemplary adaptation engine 210 comprises a learning module 220, a system model 230, and a pole-placement module 240, discussed below in conjunction with FIG. 3. The learning module 220 processes a control output 215 from the correction engine 250, such as the amount of resources added (u(k)), and a scoring metric 285, such as a response time of a particular processing step.

Likewise, the exemplary correction engine 250 suggests changes to the allocated amount of resources in order to ensure satisfaction of the SLA, as discussed further below in conjunction with FIG. 5. The exemplary correction engine 250 generates a current value of a scoring metric 285 and comprises a set of reference levels 260, a controller 270, a system representation 280 and a feedback module 290, discussed below in conjunction with FIG. 3.

Figure 3:
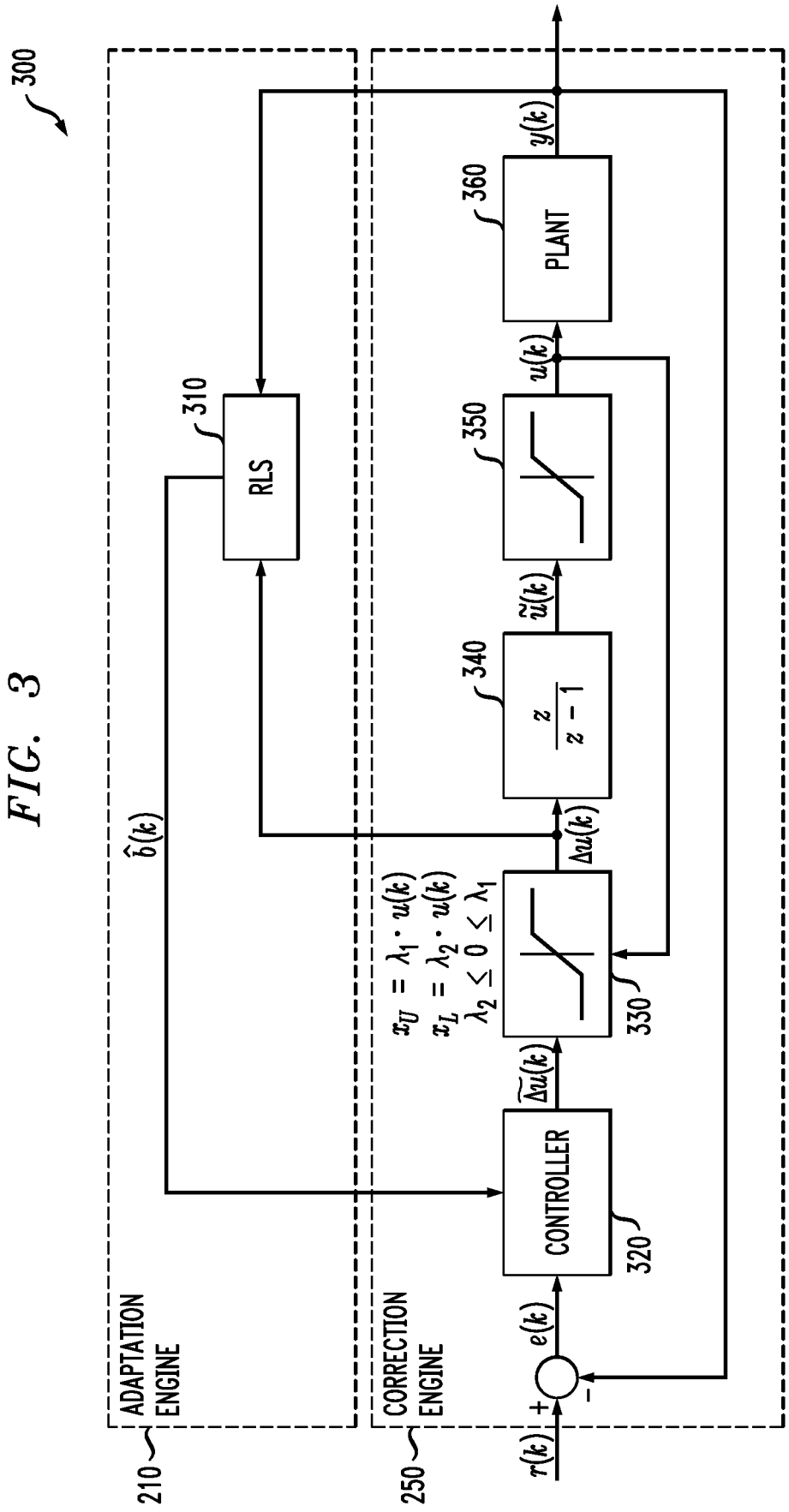
FIG. 3 illustrates an exemplary implementation of the adaptation-correction system of FIG. 2 in further detail, according to one or more embodiments of the disclosure.

FIG. 3 illustrates an exemplary implementation 300 of the adaptation-correction system 200 of FIG. 2 in further detail, according to one or more embodiments of the disclosure. In at least one embodiment, the adaptation engine 210 and the correction engine 250 work in tandem to ensure satisfaction of the SLA and perform simultaneous actions.

Adaptation Engine 210

As shown in FIG. 3, a Recursive Least Squares (RLS) module 310 in the adaptation engine 210 learns system parameters b(k), which are generated by the relation between the amount of resources added (u(k)) and the response time of the particular step y(k)).

The adaptation engine 210 may not be needed if a dynamic between resource allocation and a given SLA metric could be defined for each workload and this dynamic was the same or, at least, very similar. Since this typically cannot be assumed for each resource allocation-SLA metric pair, a learning step is needed. Even in the same job, multiple kinds of workloads might generate different allocation dynamics.

The dynamic relation between resource allocation and SLA metric is represented by Equation (1), below. It can be assumed, however, that these relationships can be mapped by a first order differential equation, as shown by X. Liu et al., "Adaptive Entitlement Control of Resource Containers on Shared Servers," *IFIP/IEEE International Symposium on Integrated Network Management*, 163-76 (May 2005), incorporated by reference herein in its entirety.

$$x(k+1)=a \cdot x(k)+b \cdot u(k) \quad (1)$$

Equation (1) is a first-order differential equation with parameters to be discovered used as a system model for the relation between resource allocation and SLA metric In Equation (1), a and b are the parameters to learn, which can be learned using any regression algorithms. The parameter a represents the current SLA metric observation, whereas b represents the effect of a different allocation u(k).

The output of the RLS learning module 310 is a parametrized system model, $\hat{b}(k)$, that will be used by the pole-placement module 240 in the adaptation engine 210 (where b is applied to the controller 320). The pole-placement module 240 ensures a desired closed loop dynamic between the system input (the amount of allocated resources, r(k)) and the output, y(k) (a value of a given SLA metric).

Correction Engine 250

As shown in FIG. 3, the correction engine 250 works by receiving feedback of the execution conditions, y(k), (typically, a given SLA metric) as well as the current learned model, $\hat{b}(k)$, generated by the RLS learning module 310 of the adaptation engine 210, as discussed hereinafter. The correction engine 250 uses this information to calculate the pole placement of the closed loop system. The pole placement calculation can be performed using Laplace Transforms, for example, when the differential equations are linear and with a finite order, or by using machine learning algorithm(s) in the more general cases, since a neural network with hidden layers is a universal approximator. See, for example, K. Hornik, "Approximation Capabilities of Multilayer Feedforward Networks," *Neural Networks*, Vol. 2, No. 4, 251-57 (1991), incorporated by reference herein in its entirety.

As shown in FIG. 3, a controller 320 (e.g., a proportional controller) takes the parameter $\hat{b}(k)$ learned by the adaptation engine 210 and uses the parameter, $\hat{b}(k)$, to modify the feedback loop dynamics, which is fed by (r(k)−y(k)=e(k)), where r(k) is a target value of the scoring metric 285 of interest, such as a target response time, and y(k) is the current value of the scoring metric 285, such as the response time of the particular step, to obtain an error, e(k).

The relation of the amount of resources added (u(k)) and the response time of the particular step y(k) is assumed to be piecewise linear, and a saturation module 330 is added after the controller 320 in order to bound the error between the assumed dynamics and the actual dynamics. In some embodiments, the saturation module 330 is adaptive as well, and has two parameters, $\lambda_1$ and $\lambda_2$, as shown in FIG. 3. These two parameters, $\lambda_1$ and $\lambda_2$, are associated with a trade-off between allowed oscillation around the set-point and convergence rates. The smaller the absolute value of these parameters are, the less the system representation 280 will oscillate, but convergence will be slower. An example of a particular parametrization of both parameters, $\lambda_1$ and $\lambda_2$, is discussed below in a section entitled "Example."

In the embodiment of FIG. 3, the system representation 280 of FIG. 2 is implemented using an integrator block 340, a saturation block 350 and a plant block 360. As shown in FIG. 3, the output of the saturation module 330 is processed by the integrator block 340, represented by the equation $$\frac{z}{z-1},$$

representing an integrator block in the Z-transform domain. The integrator block 340 represents that, in some embodiments, the output from the controller 320 and saturation module 330 is an increment in the current allocation, rather than a full allocation. To illustrate, suppose an allocation at time instant k is x(k)=4.1, the control output from the saturation module 330 is u(k)=0.1 and model parameter a=1. A next allocation according to equation (1) will be x(k+1)=4.1+0.1=4.2, instead of just 0.1, which means that the integrator block 340 will sum the contribution of the current control output, u(k), to the current allocation to obtain a new allocation.

The output of the integrator block 340 is processed by saturation block 350, which prevents the allocation from exceeding the amount of available resources (e.g., processing cores, memory or network bandwidth available) of the device. Thus, the inferior limit of the saturation block 350 is 0 in most implementations and the superior limit of the saturation block 350 is MAX_RESOURCE, where MAX_RESOURCE is the number of processing cores, amount of memory or amount of network bandwidth available of the device, depending on the resource that is being controlled (computation, memory or network, respectively). Finally, the plant block 360 translates the allocation, x(k), into a new SLA metric, y(k). In other words, the plant block 360 is typically implemented as a highly nonlinear function modeled as a first-order differential equation that continually learns the system model, $\hat{b} \sim b$, at each iteration.

For a more detailed discussion of the adaptation-correction system 200 of FIGS. 2 and 3, see, for example, U.S. patent application Ser. No. 16/400,289, filed May 1, 2019, entitled "Adaptive Controller for Online Adaptation of Resource Allocation Policies for Iterative Workloads Using Reinforcement Learning," (now U.S. Pat. No. 11,366,697), incorporated by reference herein in its entirety.

Adaptation of Resource Allocation for Multiple Workloads

In one or more embodiments, a model is provided characterizing the dynamics of the workload execution. The disclosed model does not need to be perfect, but flexible enough to be adaptable to a wide range of workloads. To this end, a first order model that relates the SLA metric to allocations is assumed to be good enough if adapted online. See, for example, X. Liu et al., "Adaptive Entitlement Control of Resource Containers on Shared Servers," *IFIP/IEEE International Symposium on Integrated Network Man-* *agement,* 163-76 (May 2005), incorporated by reference herein in its entirety. In summary, it is assumed that the dynamics that relate allocations with SLA metrics are from the kind:

$$s_i(k) = s_i(k-1) + b_{1i}\Delta u_i(k) - b_{2i}\sum_{j \neq i} u_j(k)$$

where s(k) is the SLA metric of interest in step k, $b_{1i}$ is the term that relates the self-allocation of workload i with respect to the target SLA metric, $b_{2i}$ is the term that accounts for interference of an allocation to other workloads with respect to the target SLA metric, $u_i(k)$ is the amount of a particular resource allocated at a step k.

In some embodiments, an automatic mechanism is provided to control multiple iterative workloads from a single machine in which the workloads share resources. This control assumes no prior knowledge of such workloads and aims to stabilize these in the long run with respect to the SLA metrics. The controller takes three pieces of information as inputs:

the current SLA metric measured at the time of the control;

the previously measured SLA metric; and the amount of CPU spent by all the other concurrent workloads.

This applied information is used to fit a linear control that cancels the dynamic, a deadbeat control that cancels both the direct dynamics (e.g., the dynamics related from allocation $r_i$ to workload $w_i$) and the interferences (e.g., the dynamics related from allocations $r_j$ to workload $w_i$, j≠i). This controller extends a controller disclosed in U.S. patent application Ser. No. 16/400,289, (now U.S. Pat. No. 11,366,697), referenced above, with a new term to cancel possible effects from interferences. The control law for workload $w_i$ is, then:

$$u_i(k) = \frac{1}{k_c \cdot \hat{b}_{1i}} \cdot e_i(k) + \hat{b}_{2i}\sum_{j \neq i} u_j(k)$$

$$e_i(k) = s_i(k) - s_i(k-n+1)$$

where n is the number of controlled workloads at the point in time k.

Figure 4A:
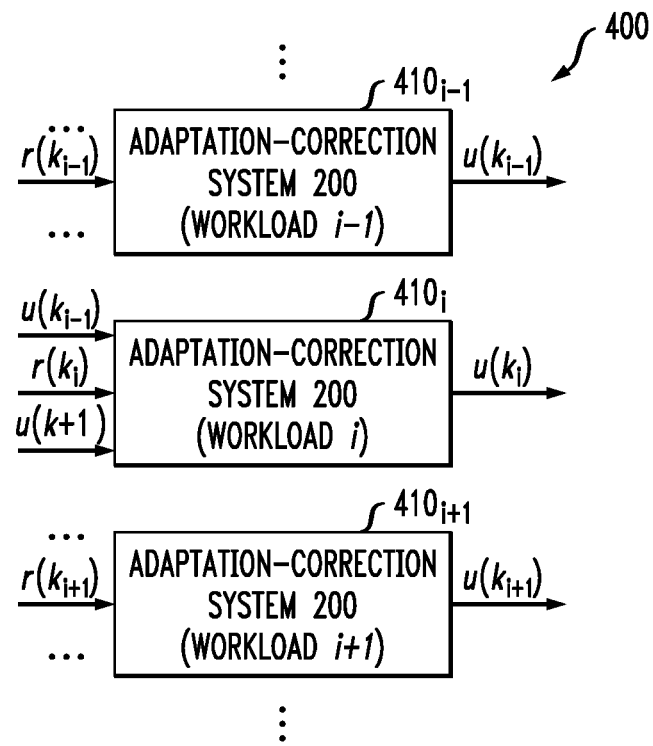
FIGS. 4A and 4B illustrate the adaptation-correction system of FIGS. 2 and 3 in further detail for multiple workloads, according to embodiments of the disclosure.

FIG. 4A illustrates an implementation 400 of the adaptation-correction system of FIGS. 2 and 3 in further detail for multiple workloads, according to embodiments of the disclosure. As shown in FIG. 4A, the implementation 400 comprises a plurality $410_{i-1}$ through $410_{i+1}$ of the adaptation-correction systems 200 of FIG. 2, each corresponding to a particular workload i−1 through i+1.

In the embodiment of FIG. 4A, the adaptation-correction system $410_i$ associated with workload i receives as inputs $r(k_i)$ (target value of the scoring metric 285 of interest, such as a target response time), and the amount of resources added for the other workloads (e.g., $u(k_{i-1})$ and $u(k_{i+1})$). The adaptation-correction system $410_i$ associated with workload i determines a new amount of resources to add for the current workload (i).

The adaptation-correction systems 410 associated with the other workloads (other than workload i) operate in a similar manner as the illustrated adaptation-correction system $410_i$ for workload i.

Figure 4B:
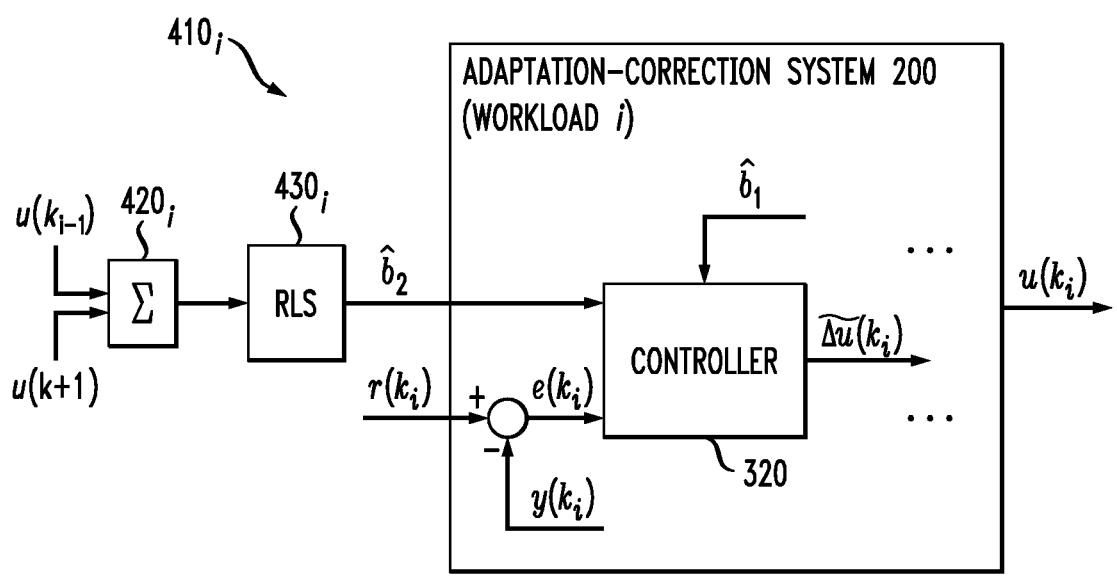

FIG. 4B illustrates the adaptation-correction system $410_i$ associated with workload i of FIG. 4A in further detail, according to an embodiment of the disclosure. As shown in FIG. 4B, the adaptation-correction system $410_i$ comprises the controller 320 of FIG. 3 (as well as the other elements of the adaptation-correction system of FIGS. 2 and 3, which have been omitted for ease and clarity of illustration but operate in a similar manner as described above for the adaptation-correction system of FIGS. 2 and 3).

As shown in FIG. 4B, the controller 320 takes the parameter $\hat{b}(k)$ learned by the adaptation engine 210 and uses the parameter, $\hat{b}(k)$, to modify the feedback loop dynamics, which is fed by $(r(k)-y(k)=e(k))$, where $r(k)$ is a target value of the scoring metric 285 of interest, such as a target response time, and $y(k)$ is the current value of the scoring metric 285, such as the response time of the particular step, to obtain an error, $e(k)$.

In addition, the adaptation-correction system $410i$ comprises a summer $420i$ to sum the allocations of the concurrent workloads (other than workload i) and uses a Recursive Least Squares (RLS) $430_i$ for adaptation. RLS is a good choice for iteratively fitting a linear model, which is the case. Fitting successive linear models is faster than fitting non-linear models and can reasonably emulate these non-linearities with fast enough adaptation cycles.

As stated previously, the direct impact of changing allocations to a particular workload are considered, as well as the interference caused by other workloads.

Because there are two different metrics influencing the behavior of the workload performance, which is measured by the SLA metrics, three different actions are performed:

1. adapt the parameter of self-allocation to SLA metric relationship;
2. adapt the interference parameter; and
3. control the workload (e.g., change the allocations to reach the desired SLA metric).

There may be a conflict between the two first necessities. If both metrics are adapted concomitantly, it is not possible to know if a change in the SLA metric occurred due to a change in the allocation for that particular workload (i.e., a self-allocation change) or due to changes in other allocations, which caused more or less interference.

In one or more embodiments, the disclosed solution alternates these actions. It is believed that in many cases the self-allocation parameter is more relevant to the SLA metric than interferences, and, thus, more data points are used to adapt the self-allocation parameter to obtain a more stable configuration.

This is done by dividing the full control process into n steps, where n is the number of monitored/controlled workloads at a moment in time. (n−1) steps are used to collect enough data to adapt the self-allocation parameter, $\hat{b}_{1i}$, and the other remaining step is used to adapt the interference parameter, $\hat{b}_{2i}$, and apply the control law with both learned parameters.

FIG. 5 is a flow chart illustrating an exemplary implementation of a resource allocation adaptation process 500 for multiple workloads, according to one embodiment of the disclosure. As shown in FIG. 5, the exemplary resource allocation adaptation process 500 initially obtains a dynamic system model during step 510 based on a relation between an amount of at least one resource for multiple iterative workloads and predefined service metric(s). In addition, an instantaneous value of the service metric(s) is obtaining during step 520, for example, from a resource allocation correction module.

During step 530, the dynamic system model, an interference effect and a difference between the instantaneous value of the predefined service metric(s) and a target value for the predefined service metric(s) are applied to a given controller associated with a given one of the multiple iterative workloads. As discussed above, the interference effect accounts for the additional iterative workloads of the multiple iterative workloads on the given iterative workload. The given controller determines optionally an adjustment to the amount of the at least one resource for the given iterative workload to substantially minimize the difference.

Figure 6:
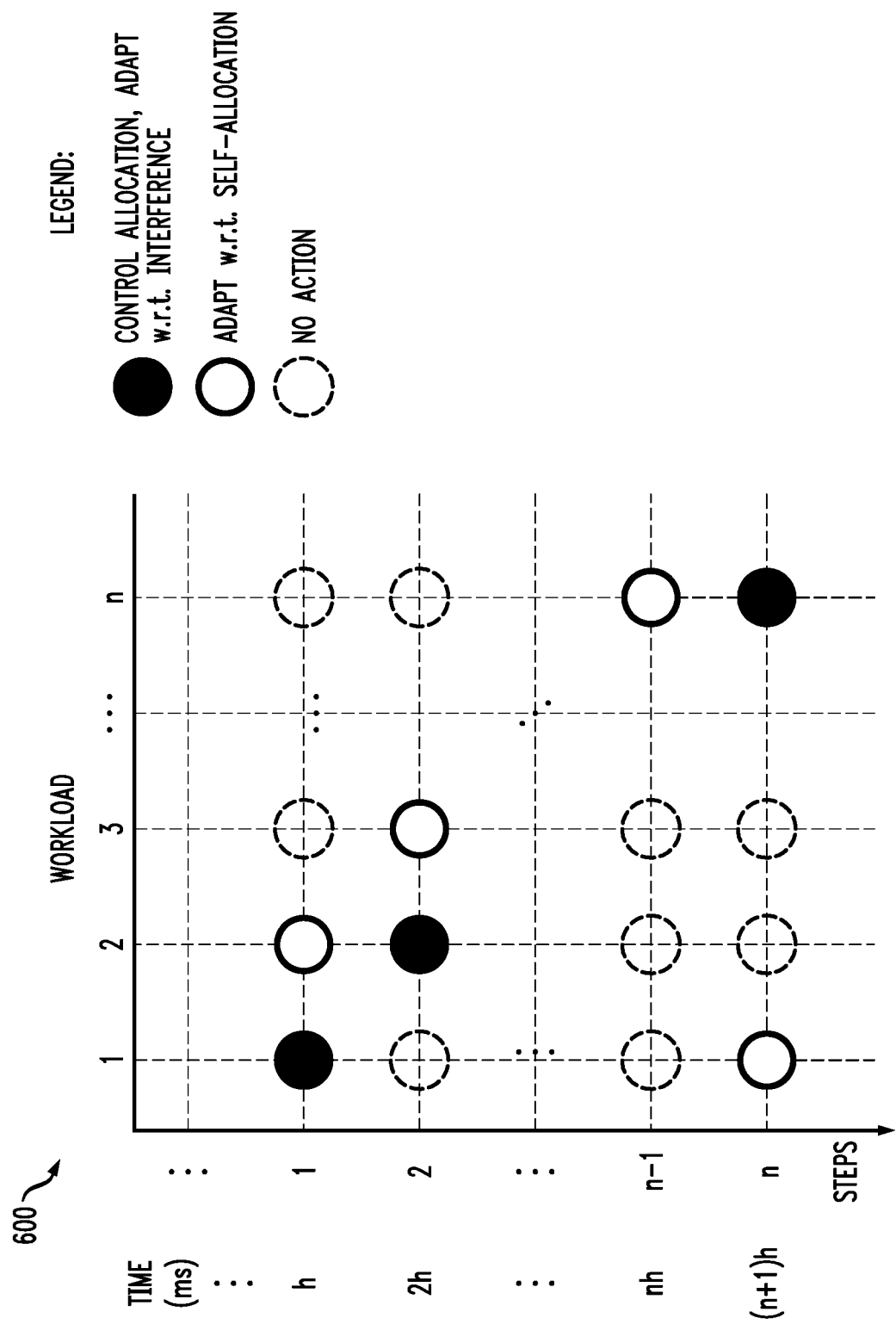
FIGS. 6 through 9 illustrate exemplary cycles for adapting a resource allocation for multiple workloads, according to some embodiments.

FIG. 6 illustrates an exemplary cycle 600 of an alternating control/adaptation schema for adapting a resource allocation for multiple workloads (1 through n), according to some embodiments. The adaptation engine 210 (FIG. 2) adapts with respect to self-allocation for n−1 steps (e.g., steps 1 through n−1) after it changed its allocation. One step after that (step n), the adaptation engine 210 changes the allocation of this workload and the cycle restarts. The steps are sampled every h milliseconds in this example.

In comparison with a naive approach, the disclosed resource allocation method for multiple workloads 'skips' n−1 steps of control allocation for each workload. Since steps are sampled every h milliseconds, in some embodiments, this means that n×h milliseconds will pass before a workload performs control allocation again. For example, in FIG. 6, the resource allocation of workload 1 will be controlled in step 1 and then again only at step (n+1), instead of at every step. This impacts a convergence time of workload 1, (convergence here defined as being close enough to the set-point, e.g., step when iteration time reaches set-point within an acceptable percentage), in proportion to the number of competing workloads n. The impact of this delayed (and reduced number of) actuations for each workload in the convergence time is reasonably small enough to justify the approach (especially in cases where n is small, no discernable effect is observed on the convergence time (see the discussion of FIGS. 11 and 12, discussed below).

The disclosed approach also leverages a mechanism to deal with the insertion and removal of workloads in an online fashion (e.g., meaning that the controller can be deployed as a continuously running process that deals with new workloads and finished workloads transparently). A mechanism is employed that keeps a list of active workload indexes $w_{idx}$ to be controlled and monitored. The list of active workload indexes $w_{idx}$ is updated in between cycles in order to avoid the impact of the interferences of newly added workloads in a workload that has not been controlled or adapted in a while.

Figure 7:
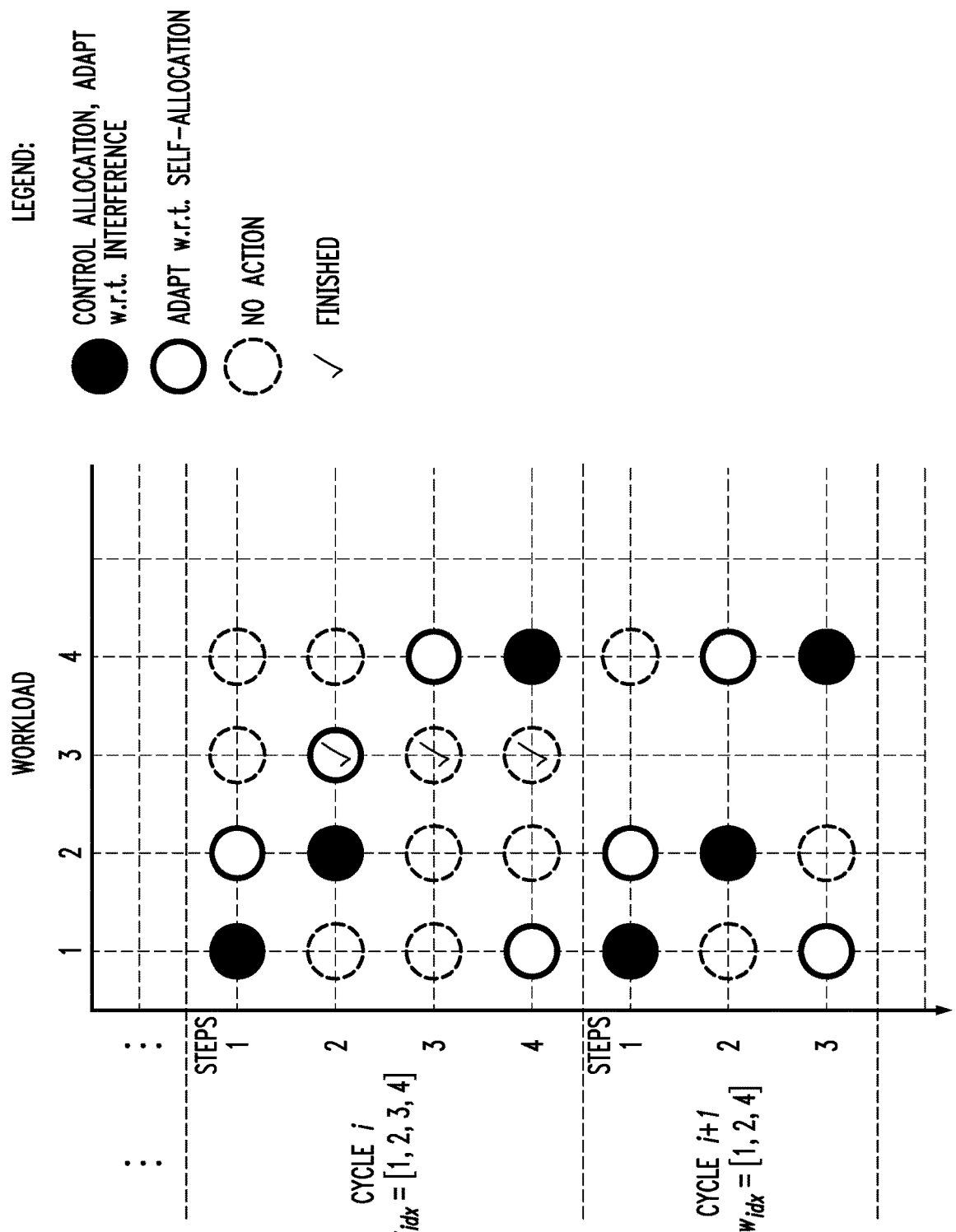

FIG. 7 illustrates an example of a finished workload 700 being removed at the end of cycle i, according to an embodiment. In the notation of FIG. 7, a finished workload is indicated with a checkmark in a circle, as shown in the Legend. The example of FIG. 7 illustrates the mechanism by which the active workloads are updated between cycles.

In example of FIG. 7, Workload 3 finishes in step 2 of cycle i. The controller does not perform the control allocation and adaptation with respect to interference for Workload 3 in step 3. The Workload 3 is removed from the $w_{idx}$ at the end of the cycle. Thus, in cycle i+1, the control loop cycles only over workloads 1, 2 and 4 (as workload 3 has been removed).

Figure 8:
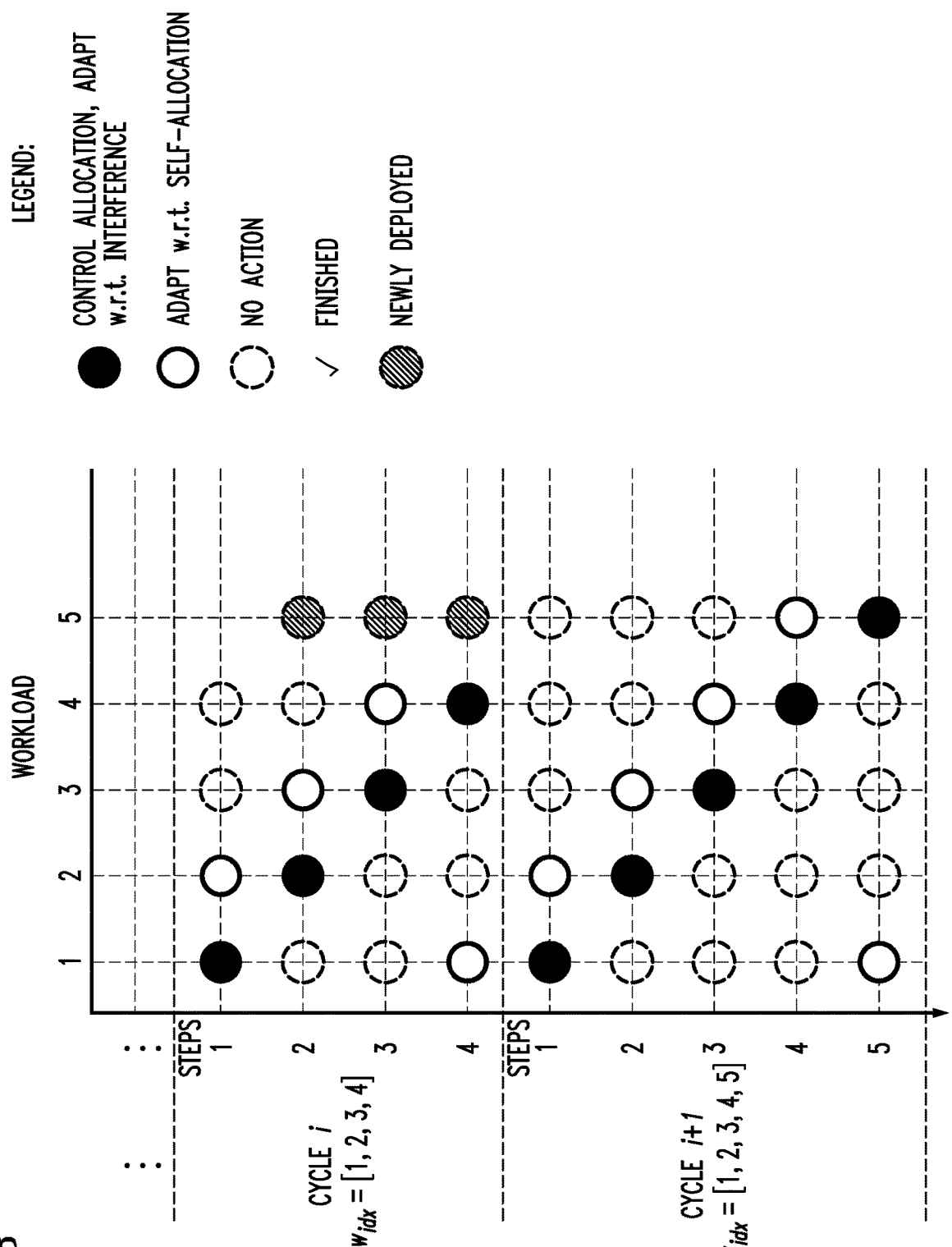

FIG. 8 illustrates an example of a newly deployed workload being added to the multiple workloads, according to one embodiment of the disclosure. In the notation of FIG. 8, a newly deployed workload is indicated with a dashed filled-in circle, as shown in the Legend.

In the example of FIG. 8, the newly deployed workload 800 is incorporated into the control loop at the end of a cycle in a similar fashion as the workload removal of FIG. 7. Thus, a newly deployed workload becomes part of the control loop between cycles.

As shown in FIG. 8, a new workload 5 is deployed in step 2 of cycle i. Notice that Workload 5 is not immediately added to the active workflow index, rather Workload 5 is included in the $w_{idx}$ for the cycle i+1. This means that the workload executes, but the controller skips over it (e.g., it does not perform the control allocation and adaptation task in step 4 of cycle i; and the presence of Workload 5 does not trigger a step 5 in that cycle).

Thus, in one or more embodiments, newly deployed workloads are not added to the control loop until the next cycle. Consider workload 3 in FIG. 8. In step 3 of cycle I, it has not been controlled/adapted for 4 steps (since last cycle) and is now adapted with respect to the interference of other workloads. If the newly deployed workload 5 is considered in this interference, the control allocation will take it into consideration immediately. This may be problematic since typically the resource consumption of workloads varies in the beginning and stabilizes later on. Furthermore, this exemplary definition of a control cycle makes the control structures simpler and more easily interpretable by a human operator. In any case, the delay of the addition of the newly deployed workload to a next cycle is not significant for reasonable values of n. This is the case for many Edge applications, for example, at which a number of applications share the physical infrastructure but not too many, since this would impact the very strict latency requirements of such applications. Even in cloud applications, it is usual to separate workloads through virtualization and run only a few of them concurrently within a Virtual Machine (VM).

Figure 9:
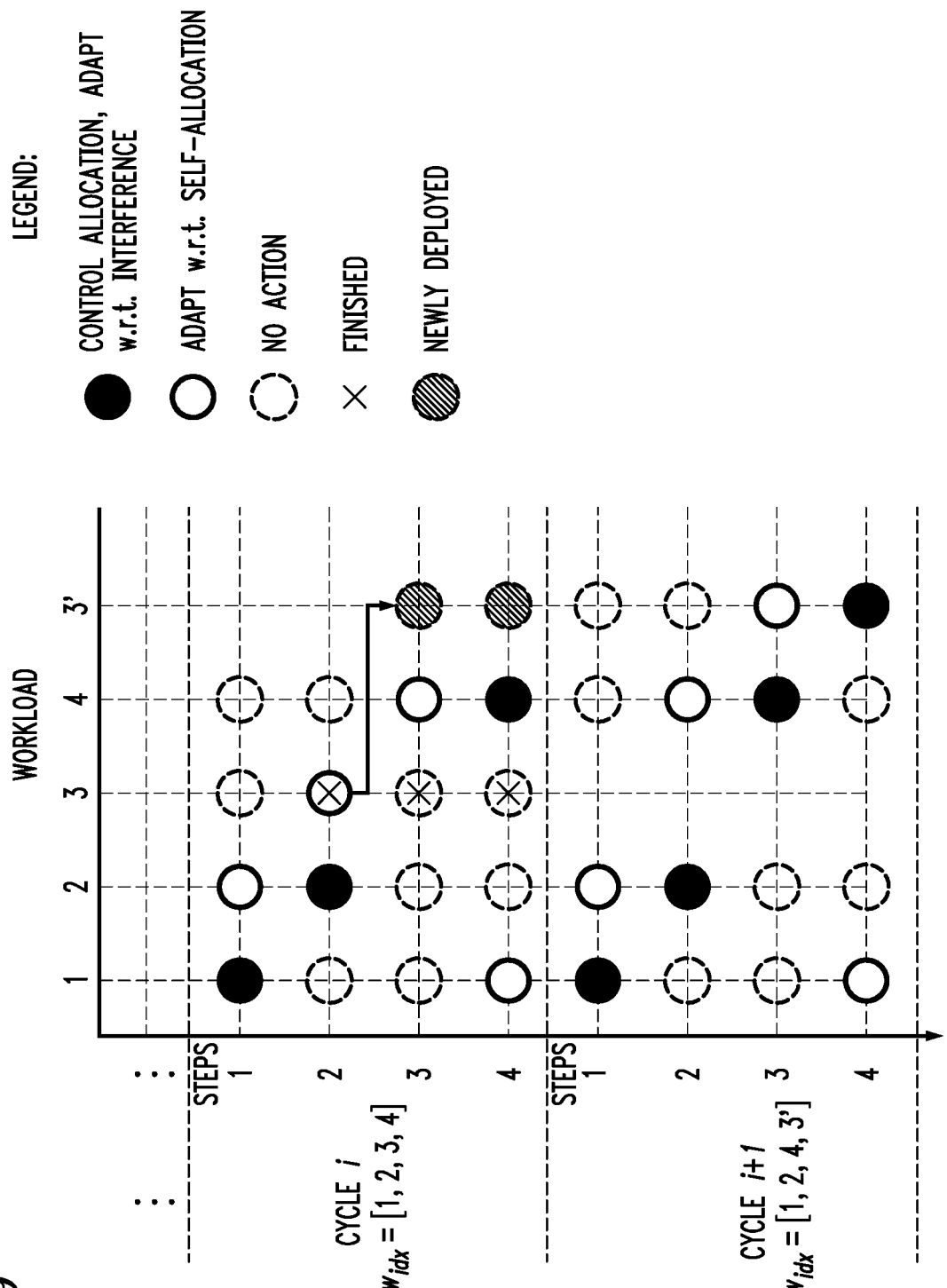

FIG. 9 illustrates an example of a redeployment of a failed workload 900, according to one or more embodiments. The example of FIG. 9 highlights how the mechanism allowing the removal of workloads from the cycle along with the mechanism allowing the addition of new workloads enables a transparent handling of failed workloads. In the notation of FIG. 9, a failed workload is indicated with an "X", as shown in the Legend.

In the example of FIG. 9, workload 3 is detected as failed. Any typical evaluation of the status of a process could be applied to perform this detection, as would be apparent to a person of ordinary skill in the art (typically, the absence of an expected result file or a heartbeat system indicating the process has halted) or even using more elaborate methods based on machine learned prediction and/or identification of aberrant behavior or resource consumption patterns. The addition of the same workload to the cycle (here identified as workload 3') will take place transparently.

It is noted that the deployment of workload 3' can adopt the last known resource allocation of workload 3 as an initial configuration. This has the advantage of stabilizing the effect of the interference of workload 3' in the other workloads.

Finally, the disclosed control approach requires some parametrization. An experimental validation demonstrates that this approach is robust to very distinct parametrizations working given the following considerations regarding sampling time, the controller gain and the limits of concurrency.

In some embodiments, the sampling time h should be greater than or equal to the execution time of the most time-consuming workload (per iteration). The sampling time h also needs to be higher than the control calculation time ($t_c$). Very high values of h, however, would lead to less control actions and poorer set-point tracking capability. This relation is expressed as $h > \max(\max_i(t_i), t_c)$.

The controller gain, $k_c$, should, in some embodiments, be 1 or higher. The reason is that, with an unbiased adaptor, $k_c=1$; $\hat{b}_{1i}=b_{1i}$, is the limit of stable configurations for setpoint tracking. Higher values would turn the controller less prone to oscillations with the cost of a higher settling time.

Finally, because each cycle takes nh to be completed, there is a limit to the number of concurrent jobs that can be controlled within a single machine with this mechanism. If h is small, a larger number of workloads can be controlled. While h grows, the factor nh (the time between control adaptations for a workload) also grows and, thus, a smaller number of workloads can be controlled at the same time within a single machine. It is important, thus, to have as many reporting iterations as possible, since this would allow to reduce h, which would in turn make it possible to work with a larger number of workloads (n) at the same time. Once again, this is also the case for most edge-cloud applications, which have stringent time constraints and, thus, will have a small $t_i$.

One or more embodiments can be employed to deal with the task of training deep neural networks for (workloads A, B). These configure iterative workloads in which the resource constraints are known (that is, the adaptation of CPU cores only). Notice however that this restriction is not part of the disclosure, which presumes that different workloads could be bound (and thus adapted) regarding different computation resources, including GPU memory and amount of dedicated stream processors.

Training Deep Learning models is a common task that is very resource intensive. The characteristic of the job is to be performed in fixed-size iterations, and each of these iterations receive the name of epoch. The number of training epochs is a parameter, which means the milestones of the job can be defined, and at each iteration, the rate of completion in percentage will be 100*i/n %, i being the epoch number and n being the number of epochs specified. More granular milestones can be used in this particular example since processing each batch within an epoch is also a fixed size task. Because two different batches are assumed to take the same time to be processed if the machine state is similar, a batch or a collection of batches could also be used as the iteration to be controlled. In the case of training deep neural networks, a set point for the epoch can be used and divided to find the set-point for a collection of k=100 batches and control that set-point.

Assuming that the SLA metric to be controlled is the execution time et=T, one can feedback the amount of time t it took to complete an epoch and compare this time to the desired time per epoch, which is T/n, and the desired time for each k batches, which is $T/(n*(n/k))=T \cdot k/n^2$. If a collection of batches took longer than $T \cdot k/n^2$ to finish, more resources might me be needed. On the other hand, if the time t is significantly smaller than $T \cdot k/n^2$, this indicates the job does not need the amount of resources allocated to it and reducing the allocation can decrease cost and even make room for other jobs to run.

Figure 10:
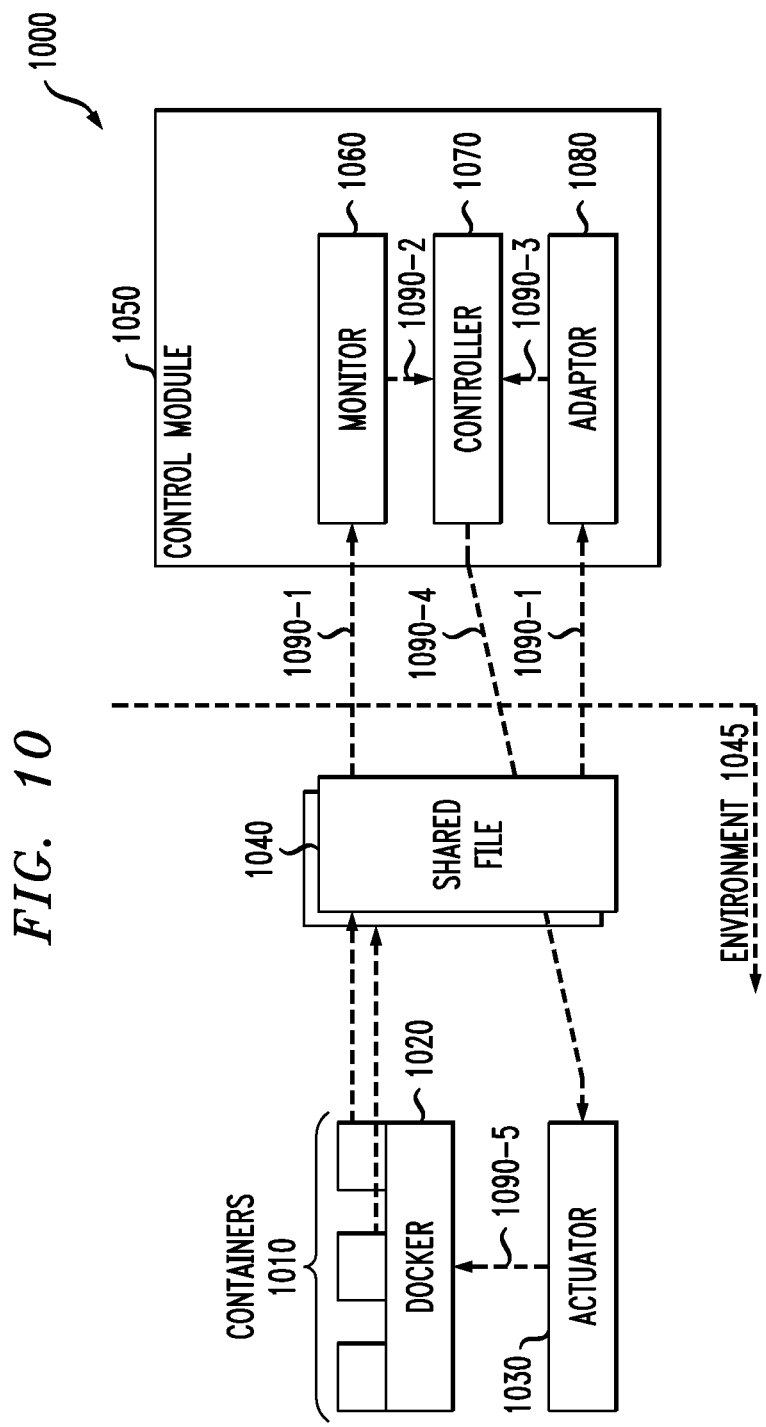
FIG. 10 illustrates an exemplary implementation of the disclosed resource allocation adaptation techniques for multiple workloads, according to some embodiments.

FIG. 10 illustrates an exemplary implementation 1000 of the disclosed resource allocation adaptation techniques for multiple workloads, according to some embodiments. The exemplary implementation 1000 uses a plurality of containers 1010, such as Docker containers 1020, which execute the iterative workloads in a shared execution environment, to implement the controller 270 of FIG. 2. Generally, Docker is a well-known lightweight container solution for multiple Operating Systems (OSs), offering controls over central processing unit (CPU) and memory limits. See, for example, D. Merkel, "Docker: Lightweight Linux Containers for Consistent Development and Deployment," Linux Journal, Vol. 2, 239 (2014), incorporated by reference herein in its entirety.

In one or more embodiments, one of the containers 1010 is chosen as the controller container (corresponding to the system representation 280 of FIG. 2) and metrics are measured in real-time. Messaging between the Docker container 1020 and a control module 1050 is implemented in the embodiment of FIG. 10 using a shared file 1040, in a known manner. The control module 1050 comprises a monitor 1060, a controller 1070 and an adaptor 1080. The exemplary monitor 1060 is a possible implementation of the feedback module 290; controller 1070 implements the elements in the correction engine 250 and the adaptor 1080 implements the mechanisms in the adaptation engine 210 of FIG. 2, and operates in a similar manner as described above.

The containers 1010/1020, actuator 1030 and shared file 1040 are part of an environment 1045.

At the end of each iteration, the containers 1010 send their performance metrics to a shared file 1040, from which the monitor 1060 and adaptor 1080 are listening (e.g., using read operations 1090-1 every h seconds). The monitor 1060 takes the error metric and sends it to the controller 1070 during step 1090-2. Adaptor 1080 infers a new parameter $\hat{b}$ and also sends it to the Controller 1070 during step 1090-3. Finally, the Controller 1070 generates a new increment in allocation, which is sent to an actuation topic of shared file 1040 during step 1090-4. The actuator 1030 is listening to this topic, and changes allocation when a new message arrives to update the containers 1010 during step 1090-5.

Figure 11:
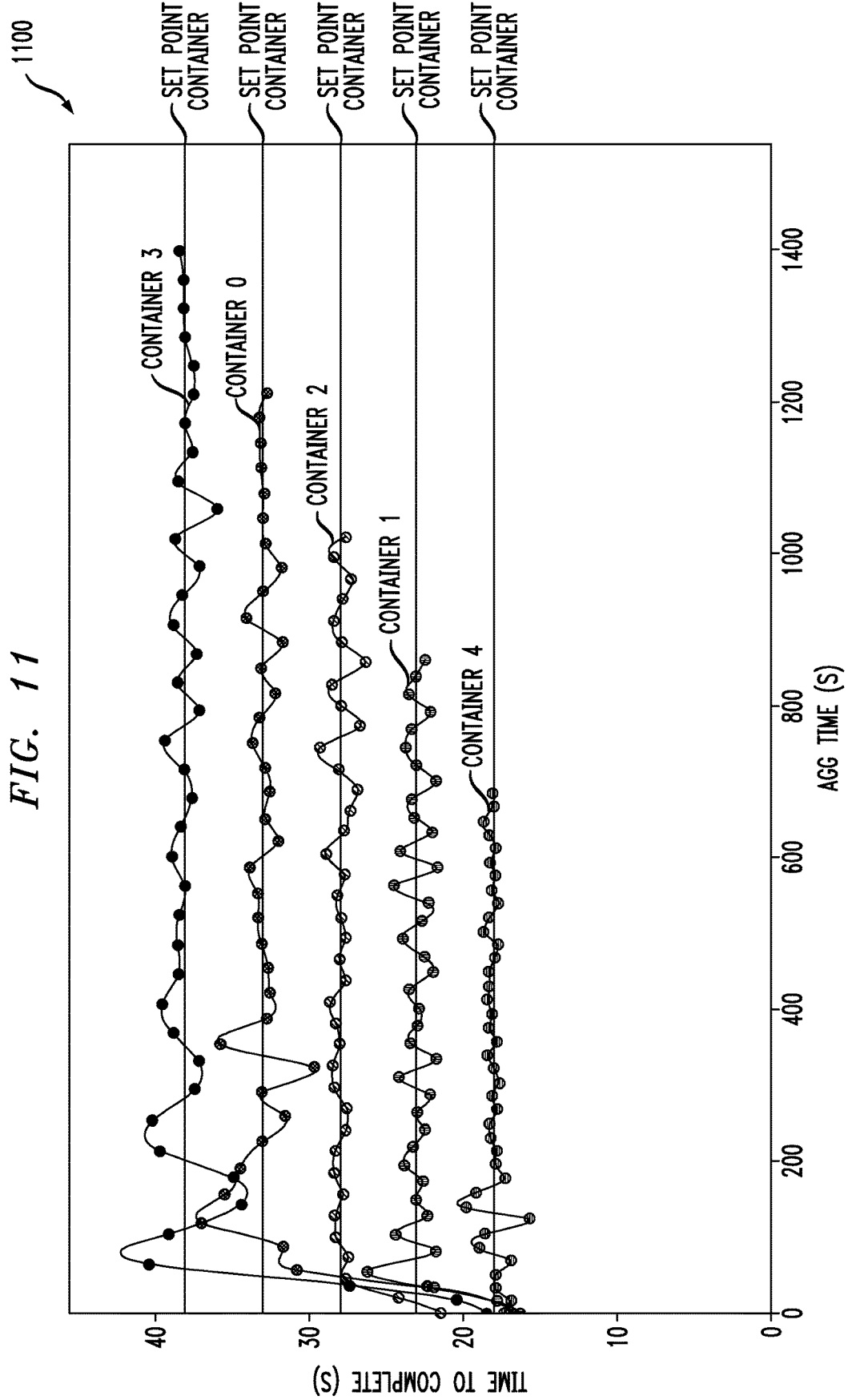
FIG. 11 illustrates an exemplary time for completion for a resource allocation adaptation for adapting multiple workloads, according to one embodiment of the disclosure.

In one exemplary implementation five DNN workloads were deployed with a different desired time per epoch (set-point). FIG. 11 illustrates an exemplary time for completion 1100 for each epoch and respective set-points for a resource allocation adaptation for adapting five exemplary workloads implemented using respective containers 0 through 4, according to one embodiment of the disclosure. This was achieved using the disclosed schema in FIG. 10, with $\lambda_1=0.25$ and $\lambda_2=-0.25$ for all workloads. It can be observed that the system takes up to 8 epochs to reach the set-point and tracks it smoothly. By using this controller, the operator has saved some resources by comparing to the initial allocation of four full CPU cores. It also appears that modelling interferences is desirable. It has been observed that, once a more resource intensive workload ends, the other workloads need less allocated resources to continue running within the desired set-points. Each of the workloads take 40 epochs to finish. It can be seen that the proposed mechanism achieves fast set-point tracking.

Figure 12:
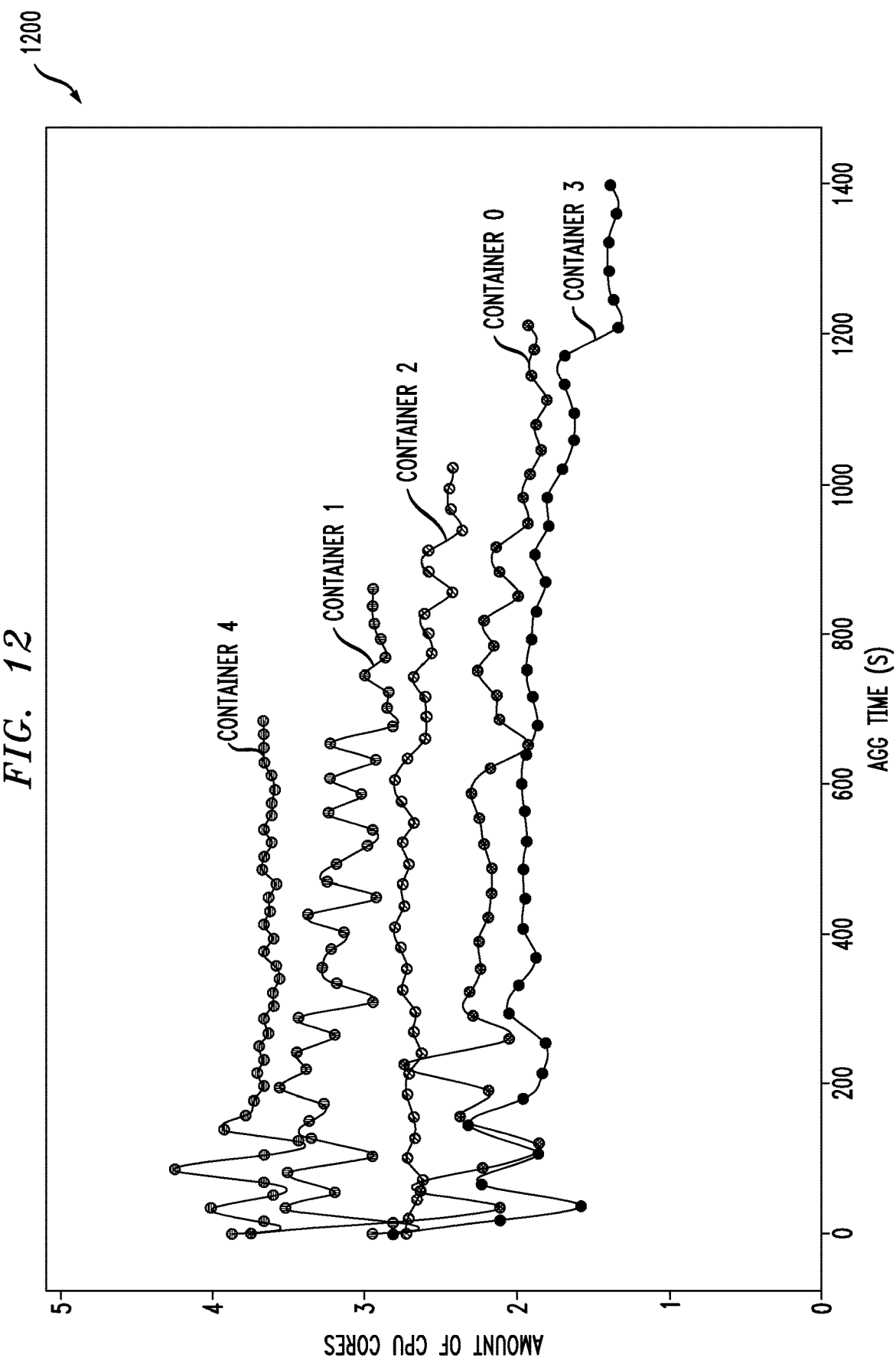
FIG. 12 illustrates an exemplary allocation of a particular resource for each workload of multiple workloads, according to some embodiments of the disclosure.

FIG. 12 illustrates an exemplary allocation 1200 of a particular resource (e.g., CPU shares) for each workload of five exemplary workloads implemented using respective containers 0 through 4, according to some embodiments of the disclosure. In the graph of FIG. 12, when more resource consuming workloads finish, the other workloads can lower their allocations to keep tracking their set-points.

The examples of FIGS. 11 and 12 illustrate the effect of interference. When a more resource intensive workload ends, the requirements for the less intensive ones drop by a little, because the workload is not interfering with the other one anymore. The mechanism, however, is still able to maintain the set-point level tracking in such situation, working as expected.

Thus, the disclosed resource allocation techniques for multiple workloads can control the resource allocation of several workloads concurrently. In addition, the convergence times are within an acceptable range. In fact, a negligible negative impact was noticed on the convergence times when compared to the resource allocation experiments controlling each workload in isolation. Finally, the disclosed resource allocation approach enables the resource allocation adaptation in cases where the naive approach does not apply.

The disclosed resource allocation mechanism learns online the effects of an allocation of resources to a particular workload response time, and also learns how the other workloads with their respective allocations interfere with the response time of the aforementioned particular workload. This is important to enhance stability and prevent some undesirable behaviors such as oscillations due to non-modelled interference.

For each workload, the effects of self-allocation with respect to response time and interference with respect to response time are learned online. A cyclic control and adaptation routine is disclosed that looks into an ordered list of workloads and cycles through the ordered list to determine when each workload learns to adapt itself to the effects of its own allocation and to the interference caused by the other concurrent workloads. This structure also allows for including newly deployed workloads in the cycle and removing finished workloads. Also, since these parameters are not dependent on the step time h, it also can optionally be changed between cycles to reflect the current list necessity.

In addition, the proposed cyclic controller mechanism can transparently deal with the redeployment of failed workloads. The adoption of the last-known resource allocation of the failed workload for its redeployment mitigates the effect of the interference factor of that workload in the resource allocation of the others.

In some embodiments, the disclosed techniques for adapting a resource allocation for multiple iterative workloads reduce an amount of time needed to perform a resource allocation for such multiple iterative workloads. One or more embodiments of the disclosure provide improved methods, apparatus and computer program products for adapting a resource allocation for multiple workloads. The foregoing applications and associated embodiments should be considered as illustrative only, and numerous other embodiments can be configured using the techniques disclosed herein, in a wide variety of different applications.

It should also be understood that the disclosed adaptive resource allocation techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for adapting a resource allocation for multiple iterative workloads may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments. In these and other embodiments, compute services can be offered to cloud infrastructure tenants or other system users as a Platform-as-a-Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as the adaptation-correction system 200, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based resource allocation platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 13 and 14. These platforms may also be used to implement at least portions of other information processing systems in other embodiments.

Figure 13:
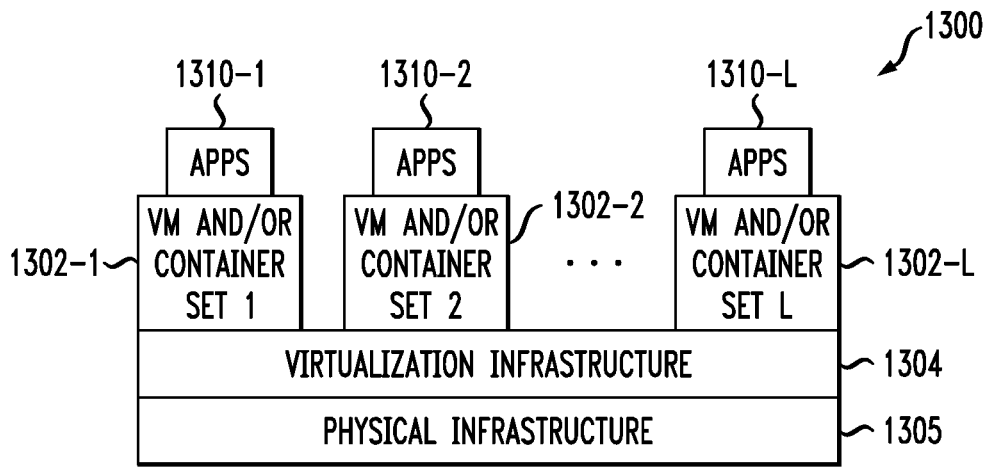
FIG. 13 illustrates an exemplary processing platform that may be used to implement at least a portion of one or more embodiments of the disclosure comprising a cloud infrastructure.

FIG. 13 shows an example processing platform comprising cloud infrastructure 1300. The cloud infrastructure 1300 comprises a combination of physical and virtual processing resources that may be utilized to implement at least a portion of the adaptation-correction system 200. The cloud infrastructure 1300 comprises multiple virtual machines (VMs) and/or container sets 1302-1, 1302-2, . . . 1302-L implemented using virtualization infrastructure 1304. The virtualization infrastructure 1304 runs on physical infrastructure 1305, and illustratively comprises one or more hypervisors and/or operating system level virtualization infrastructure. The operating system level virtualization infrastructure illustratively comprises kernel control groups of a Linux operating system or other type of operating system.

The cloud infrastructure 1300 further comprises sets of applications 1310-1, 1310-2, . . . 1310-L running on respective ones of the VMs/container sets 1302-1, 1302-2, . . . 1302-L under the control of the virtualization infrastructure 1304. The VMs/container sets 1302 may comprise respective VMs, respective sets of one or more containers, or respective sets of one or more containers running in VMs.

In some implementations of the FIG. 13 embodiment, the VMs/container sets 1302 comprise respective VMs implemented using virtualization infrastructure 1304 that comprises at least one hypervisor. Such implementations can provide resource allocation functionality of the type described above for one or more processes running on a given one of the VMs. For example, each of the VMs can implement resource allocation control logic for providing adaptive resource allocation for multiple workloads for one or more processes running on that particular VM.

An example of a hypervisor platform that may be used to implement a hypervisor within the virtualization infrastructure 1304 is the VMware® vSphere® which may have an associated virtual infrastructure management system such as the VMware® vCenter™. The underlying physical machines may comprise one or more distributed processing platforms that include one or more storage systems.

In other implementations of the FIG. 13 embodiment, the VMs/container sets 1302 comprise respective containers implemented using virtualization infrastructure 1304 that provides operating system level virtualization functionality, such as support for Docker containers running on bare metal hosts, or Docker containers running on VMs. The containers are illustratively implemented using respective kernel control groups of the operating system. Such implementations can provide resource allocation functionality of the type described above for one or more processes running on different ones of the containers. For example, a container host device supporting multiple containers of one or more container sets can implement one or more instances of resource allocation control logic and for use in performing adaptive resource allocation for multiple workloads.

As is apparent from the above, one or more of the processing modules or other components of adaptation-correction system 200 may each run on a computer, server, storage device or other processing platform element. A given such element may be viewed as an example of what is more generally referred to herein as a "processing device." The cloud infrastructure 1300 shown in FIG. 13 may represent at least a portion of one processing platform. Another example of such a processing platform is processing platform 1400 shown in FIG. 14.

The processing platform 1400 in this embodiment comprises at least a portion of the given system and includes a plurality of processing devices, denoted 1402-1, 1402-2, 1402-3, . . . 1402-K, which communicate with one another over a network 1404. The network 1404 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 1402-1 in the processing platform 1400 comprises a processor 1410 coupled to a memory 1412. The processor 1410 may comprise a microprocessor, a microcontroller, an application specific integrated circuit (ASIC), a field programmable gate array (FPGA) or other type of processing circuitry, as well as portions or combinations of such circuitry elements, and the memory 1412, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1402-1 is network interface circuitry 1414, which is used to interface the processing device with the network 1404 and other system components, and may comprise conventional transceivers.

The other processing devices 1402 of the processing platform 1400 are assumed to be configured in a manner similar to that shown for processing device 1402-1 in the figure.

Again, the particular processing platform 1400 shown in the figure is presented by way of example only, and the given system may include additional or alternative processing platforms, as well as numerous distinct processing platforms in any combination, with each such platform comprising one or more computers, storage devices or other processing devices.

Figure 14:
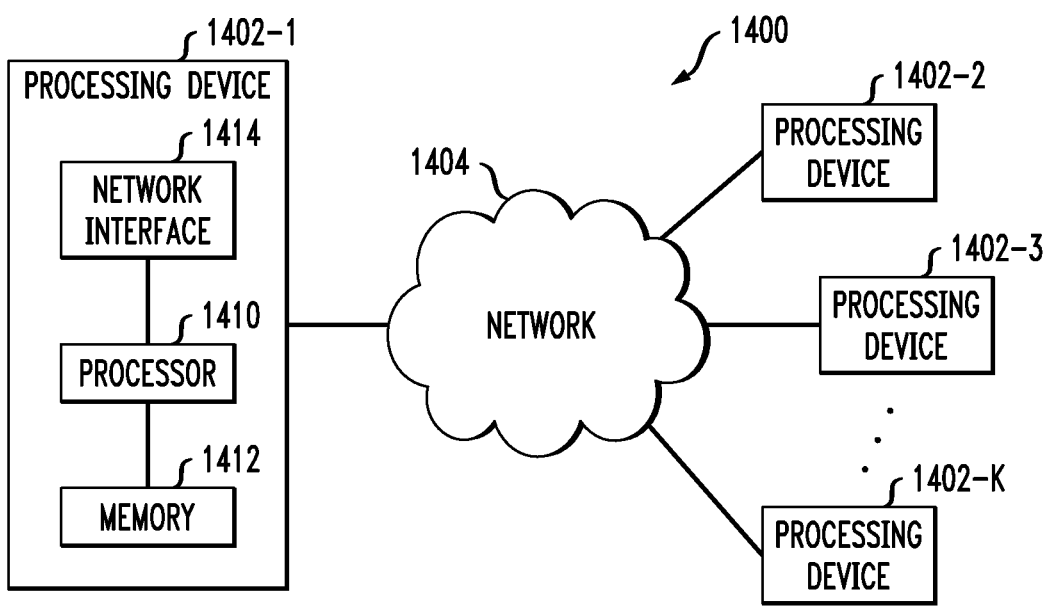
FIG. 14 illustrates another exemplary processing platform that may be used to implement at least a portion of one or more embodiments of the disclosure.

Multiple elements of an information processing system may be collectively implemented on a common processing platform of the type shown in FIG. 13 or 14, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only.

Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
    obtaining a dynamic system model based on a relation between an amount of at least one resource for a plurality of iterative workloads and at least one predefined service metric;
    obtaining an instantaneous value of the at least one predefined service metric;
    applying to a given controller associated with a given one of the plurality of iterative workloads: (i) the dynamic system model, (ii) an interference effect that aggregates an amount of an allocation of resources to one or more additional iterative workloads of the plurality of iterative workloads on a performance of the given one of the plurality of iterative workloads, (iii) a self-allocation effect of the given one of the plurality of iterative workloads on the given one of the plurality of iterative workloads with respect to the at least one predefined service metric, wherein the self-allocation effect is determined separately from the interference effect of the one or more additional iterative workloads of the plurality of iterative workloads on the given one of the plurality of iterative workloads with respect to the at least one predefined service metric, and (iv) a difference between the instantaneous value of the at least one predefined service metric and a target value for the at least one predefined service metric, wherein the given controller determines an adjustment to the amount of the at least one resource for the given one of the plurality of iterative workloads based at least in part on the difference and the interference effect; and
    initiating, by the given controller, an application of the determined adjustment to the amount of the at least one resource to the given one of the plurality of iterative workloads;
    wherein the method is performed by at least one processing device of the given controller, wherein the at least one processing device comprises a processor coupled to a memory.

2. The method of claim 1, wherein the adjustment to the amount of the at least one resource for the given one of the plurality of iterative workloads is determined by substantially minimizing the difference.

3. The method of claim 1, wherein the obtained system model is one or more of: derived from a relation between an amount of at least one resource added and the predefined service level metric and predefined based on the relation between the amount of the at least one resource added.

4. The method of claim 1, wherein the obtained system model is updated over time based on an amount of at least one resource added and the one or more predefined service metrics.

5. The method of claim 1, wherein the given one of the plurality of iterative workloads comprises a training of a Deep Neural Network.

6. The method of claim 1, wherein the at least one resource comprises one or more of a number of processing cores in a computer processor, a number of processing cores in a graphics processing unit, an amount of memory and an amount of network bandwidth.

7. The method of claim 1, wherein the determination of the adjustment to the amount of the at least one resource for the given one of the plurality of iterative workloads is performed substantially in parallel with an execution of the plurality of iterative workloads.

8. The method of claim 7, wherein the interference effect of the one or more of the plurality of iterative workloads on the given one of the plurality of iterative workloads is determined in a sequence.

9. The method of claim 8, wherein one of the plurality of iterative workloads that one or more of finished processing and failed processing is removed from the sequence.

10. The method of claim 8, wherein a newly deployed workload is added to the sequence.

11. The method of claim 1, wherein a larger number of the processing steps of the given controller are employed to adapt the self-allocation effect than a number of the processing steps of the given controller employed to adapt the interference effect.

12. A computer program product, comprising a non-transitory machine-readable storage medium having encoded therein executable code of one or more software programs, wherein the one or more software programs when executed by at least one processing device perform the following steps:
obtaining a dynamic system model based on a relation between an amount of at least one resource for a plurality of iterative workloads and at least one predefined service metric;
obtaining an instantaneous value of the at least one predefined service metric;
applying to a given controller associated with a given one of the plurality of iterative workloads: (i) the dynamic system model, (ii) an interference effect that aggregates an amount of an allocation of resources to one or more additional iterative workloads of the plurality of iterative workloads on a performance of the given one of the plurality of iterative workloads, (iii) a self-allocation effect of the given one of the plurality of iterative workloads on the given one of the plurality of iterative workloads with respect to the at least one predefined service metric, wherein the self-allocation effect is determined separately from the interference effect of the one or more additional iterative workloads of the plurality of iterative workloads on the given one of the plurality of iterative workloads with respect to the at least one predefined service metric, and (iv) a difference between the instantaneous value of the at least one predefined service metric and a target value for the at least one predefined service metric, wherein the given controller determines an adjustment to the amount of the at least one resource for the given one of the plurality of iterative workloads based at least in part on the difference and the interference effect; and
initiating, by the given controller, an application of the determined adjustment to the amount of the at least one resource to the given one of the plurality of iterative workloads.

13. The computer program product of claim 12, wherein the determination of the adjustment to the amount of the at least one resource for the given one of the plurality of iterative workloads is performed substantially in parallel with an execution of the plurality of iterative workloads.

14. The computer program product of claim 13, wherein the interference effect of the one or more of the plurality of iterative workloads on the given one of the plurality of iterative workloads is determined in a sequence.

15. The computer program product of claim 14, wherein one of the plurality of iterative workloads that one or more of finished processing and failed processing is removed from the sequence.

16. The computer program product of claim 14, wherein a newly deployed workload is added to the sequence.

17. The computer program product of claim 12, wherein a larger number of the processing steps of the given controller are employed to adapt the self-allocation effect than a number of the processing steps of the given controller employed to adapt the interference effect.

18. An apparatus, comprising:
a memory; and
at least one processing device, coupled to the memory, operative to implement the following steps:
obtaining a dynamic system model based on a relation between an amount of at least one resource for a plurality of iterative workloads and at least one predefined service metric;
obtaining an instantaneous value of the at least one predefined service metric;
applying to a given controller associated with a given one of the plurality of iterative workloads: (i) the dynamic system model, (ii) an interference effect that aggregates an amount of an allocation of resources to one or more additional iterative workloads of the plurality of iterative workloads on a performance of the given one of the plurality of iterative workloads, (iii) a self-allocation effect of the given one of the plurality of iterative workloads on the given one of the plurality of iterative workloads with respect to the at least one predefined service metric, wherein the self-allocation effect is determined separately from the interference effect of the one or more additional iterative workloads of the plurality of iterative workloads on the given one of the plurality of iterative workloads with respect to the at least one predefined service metric, and (iv) a difference between the instantaneous value of the at least one predefined service metric and a target value for the at least one predefined service metric, wherein the given controller determines an adjustment to the amount of the at least one resource for the given one of the plurality of iterative workloads based at least in part on the difference and the interference effect; and
initiating, by the given controller, an application of the determined adjustment to the amount of the at least one resource to the given one of the plurality of iterative workloads.

19. The apparatus of claim 18, wherein the determination of the adjustment to the amount of the at least one resource for the given one of the plurality of iterative workloads is performed substantially in parallel with an execution of the plurality of iterative workloads.

20. The apparatus of claim 18, wherein a larger number of the processing steps of the given controller are employed to adapt the self-allocation effect than a number of the processing steps of the given controller employed to adapt the interference effect.

\* \* \* \* \*